April 20, 1948.  N. D. PRESTON ET AL  2,439,948
AIRWAY TRAFFIC CONTROL SYSTEM
Filed Oct. 11, 1945   12 Sheets-Sheet 3

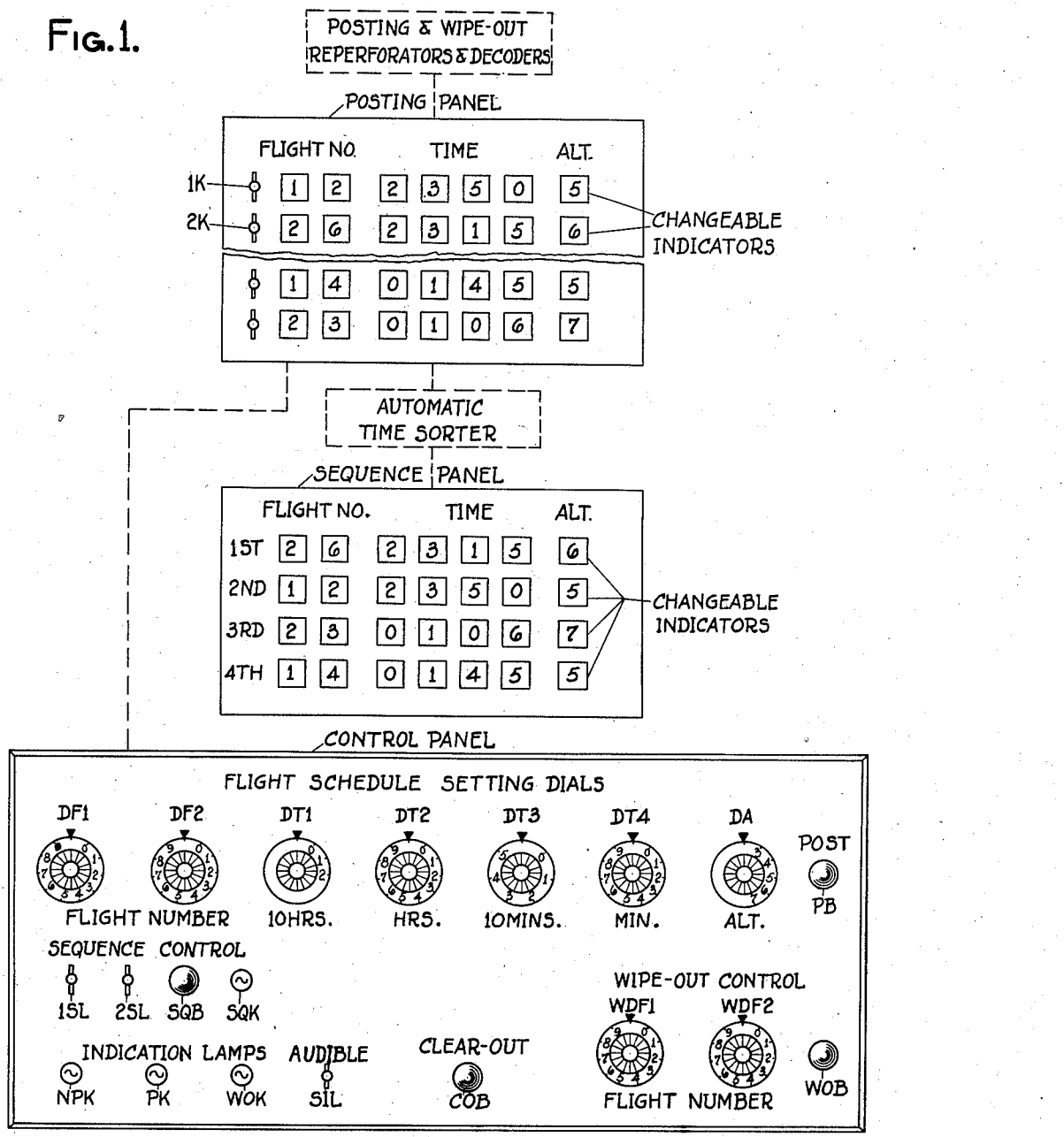

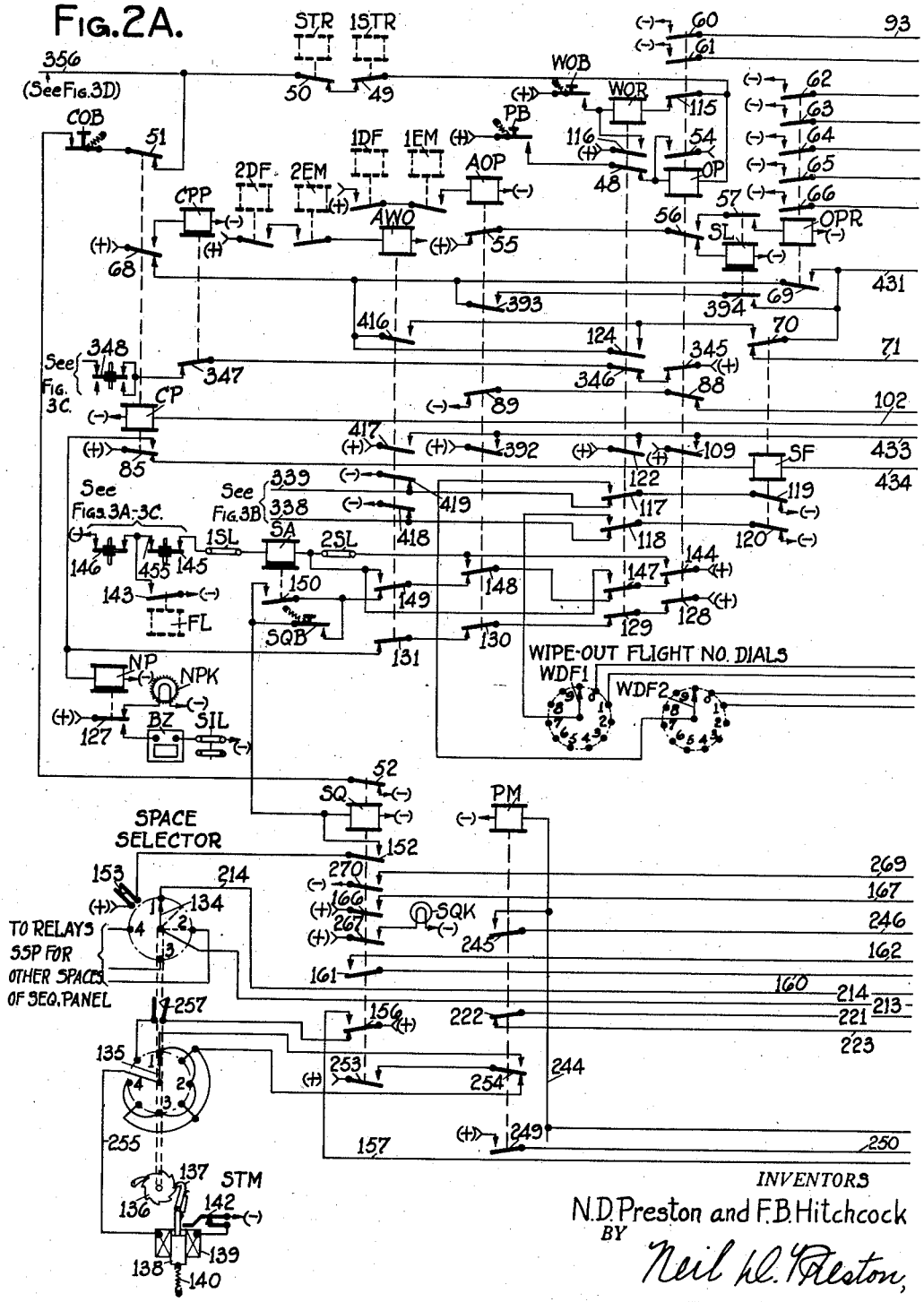

INVENTORS
N.D. Preston and F.B. Hitchcock
BY Neil W. Preston,
Their ATTORNEY

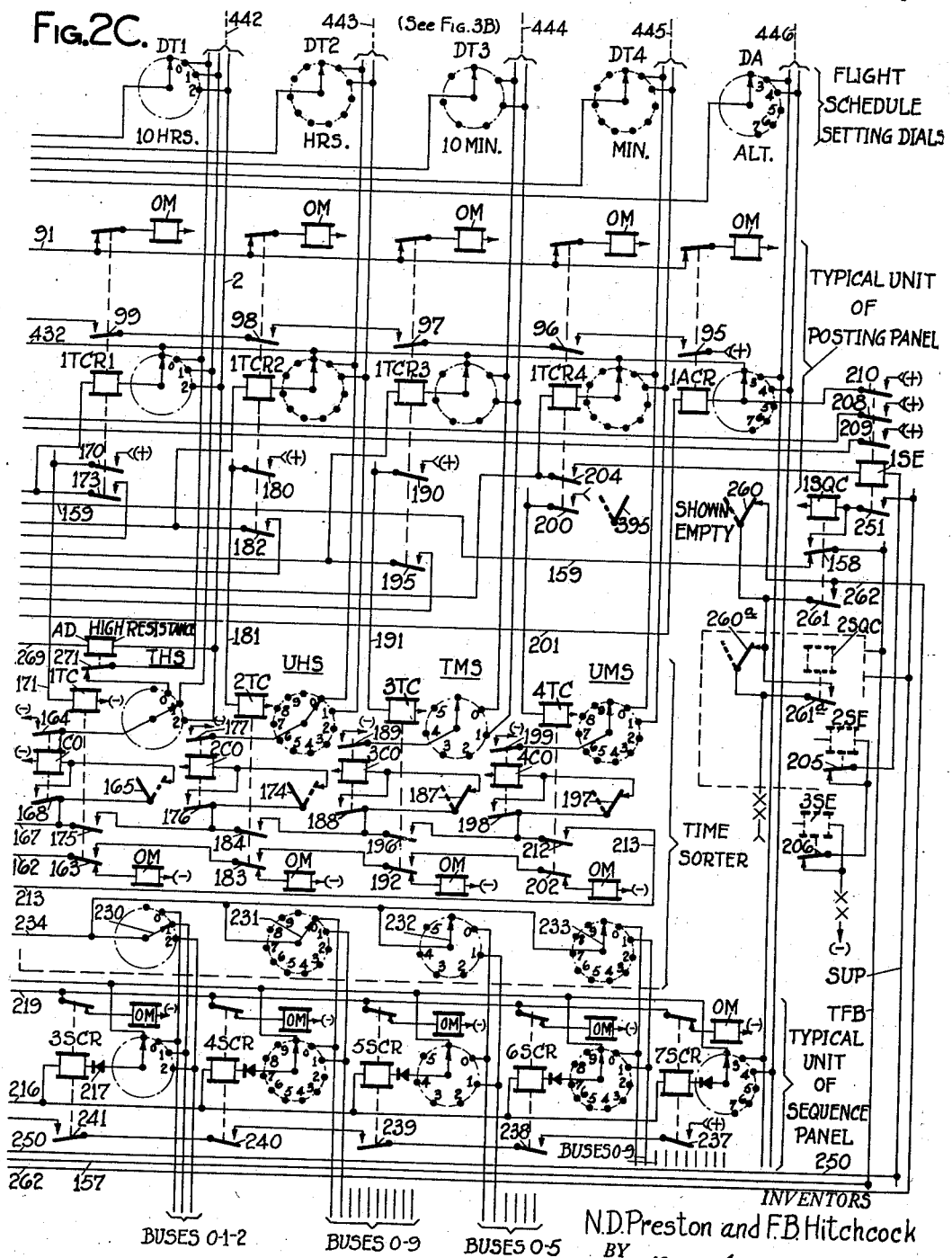

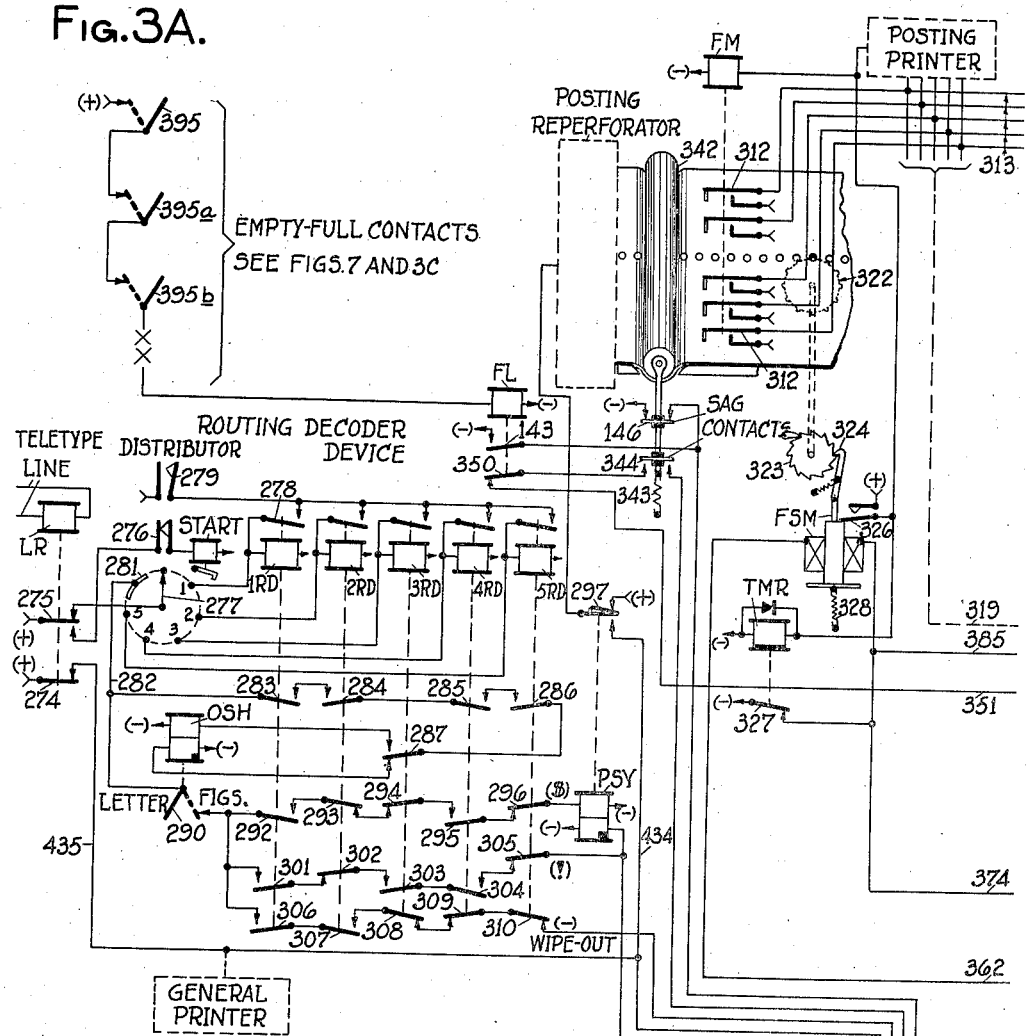

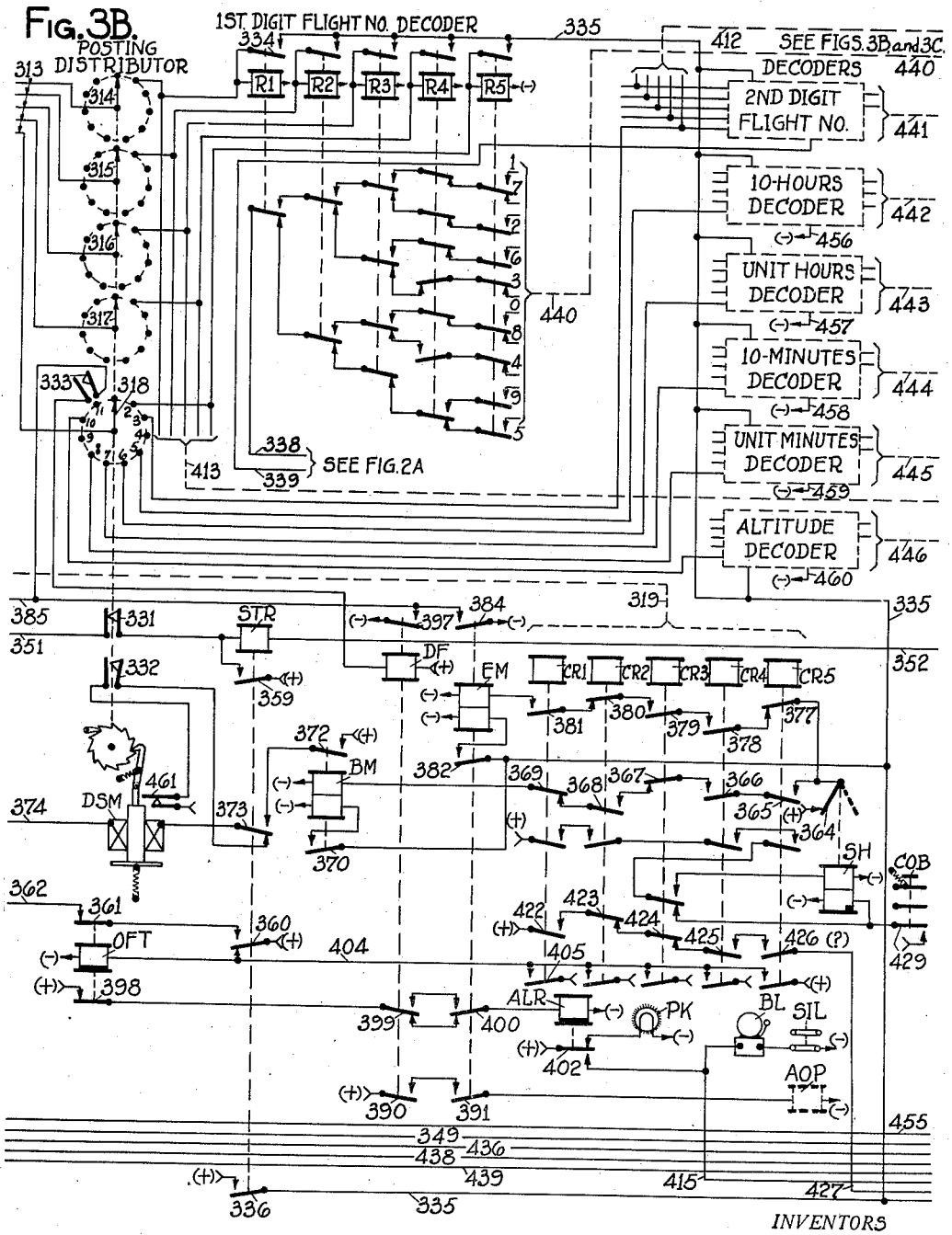

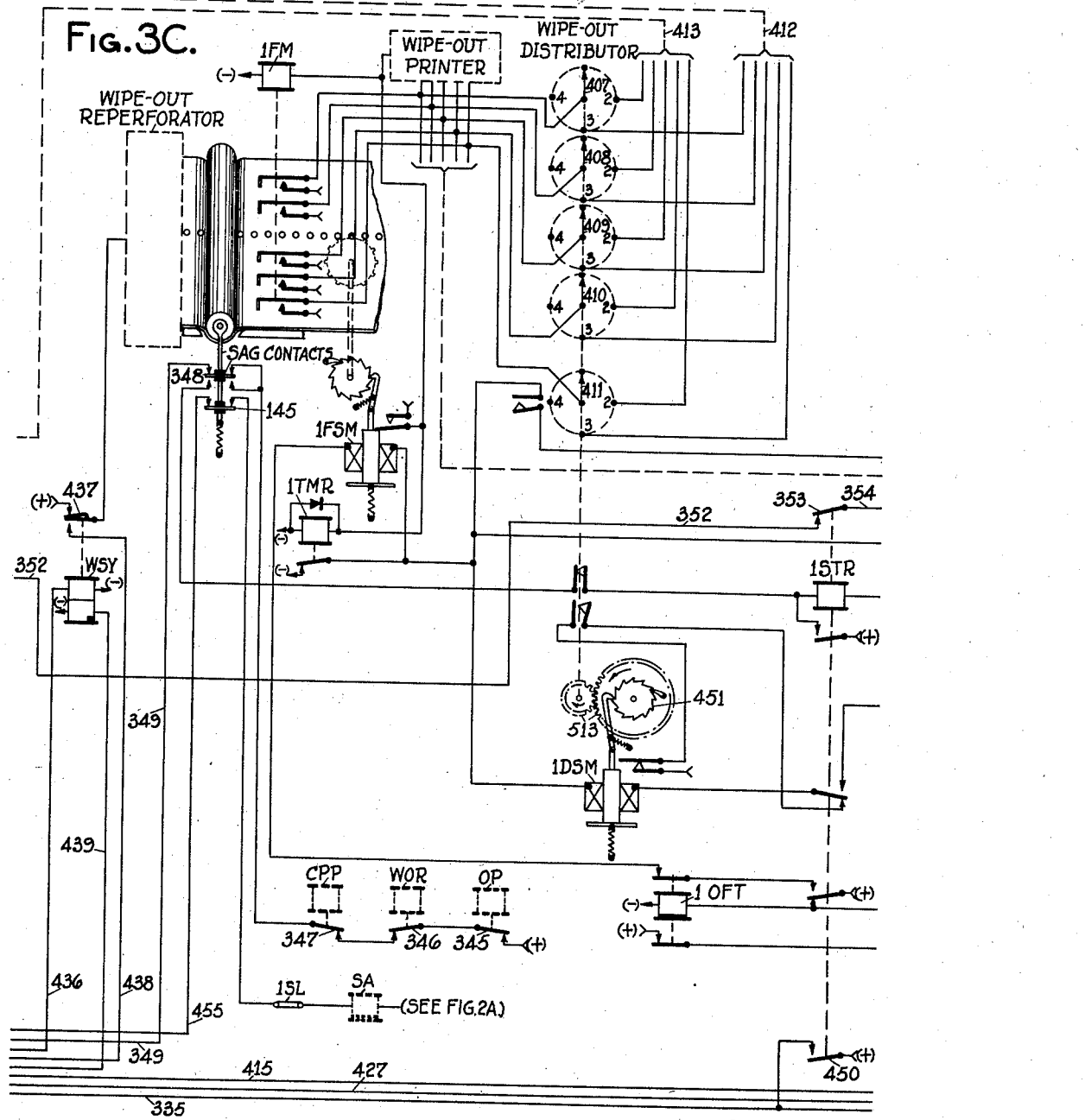

TYPICAL WIPE-OUT MESSAGE

SEQUENCE DIAGRAMS
TYPICAL MANUAL POSTING OPERATION
SET DIALS FOR FLIGHT DATA-ACTUATE PB

TYPICAL MANUAL WIPE-OUT OPERATION
SET FLIGHT NO. ACTUATE BUTTON WOB

TYPICAL SEQUENCING OPERATION

INVENTORS
N.D.Preston and F.B.Hitchcock
BY
Neil D. Preston
Their ATTORNEY

FIG. 6D.

TYPICAL TELETYPE POSTING OPERATION

TAPE PERFORATED
- POSTING SYMBOL ($) SENT
- END-OF-MESSAGE(!) SENT

↑SAG CONTACT
  ↑STR
    ↑FSM
      ↑TMR↑FM     RELAY OFT PERFORMS
      ↑FSM        TIMING OPERATION
        ↑FM
        ↑TMR

REPEAT TO FEED TO MESSAGE BEGIN SYMBOL (&)
  ↑BM    ↑TMR    ↑CR2,CR4,CR5
    ↑FSM         ↓DSM
      ↑TMR↑FM
      ↑FSM      ↑CR↑DSM
        ↑FM
        ↑TMR    ↑CR  R↑ } DECODER
                        RELAYS SET

REPEAT TO END OF MESSAGE SYMBOL(!)
  ↑FSM        ↑CR↑DSM
    ↑FM
    ↑TMR     ↑CR       POSITION 9
  ↑EM
    ↑FSM          ↑DSM  ↑DF
      ↑TMR↑FM ↑CR       AOP↑  TEST FOR SAME
                        ↑FCR-1    FLIGHT
                        ↑FCR-2
        ↑SL             ↑FV
                        ↑SF
          ↑SP
                        } SET INDICATORS
                ↑FCR ETC
↑CP
  ↑STR              ↑SP
    ↑Decoders↑FSM ↑SL    ↑DSM         ↑FCR-1↑FCR-2
↑CP                       ↑DF         ↑FV ↑TCR
      ↑CPP    ↑TMR                     ↑SF

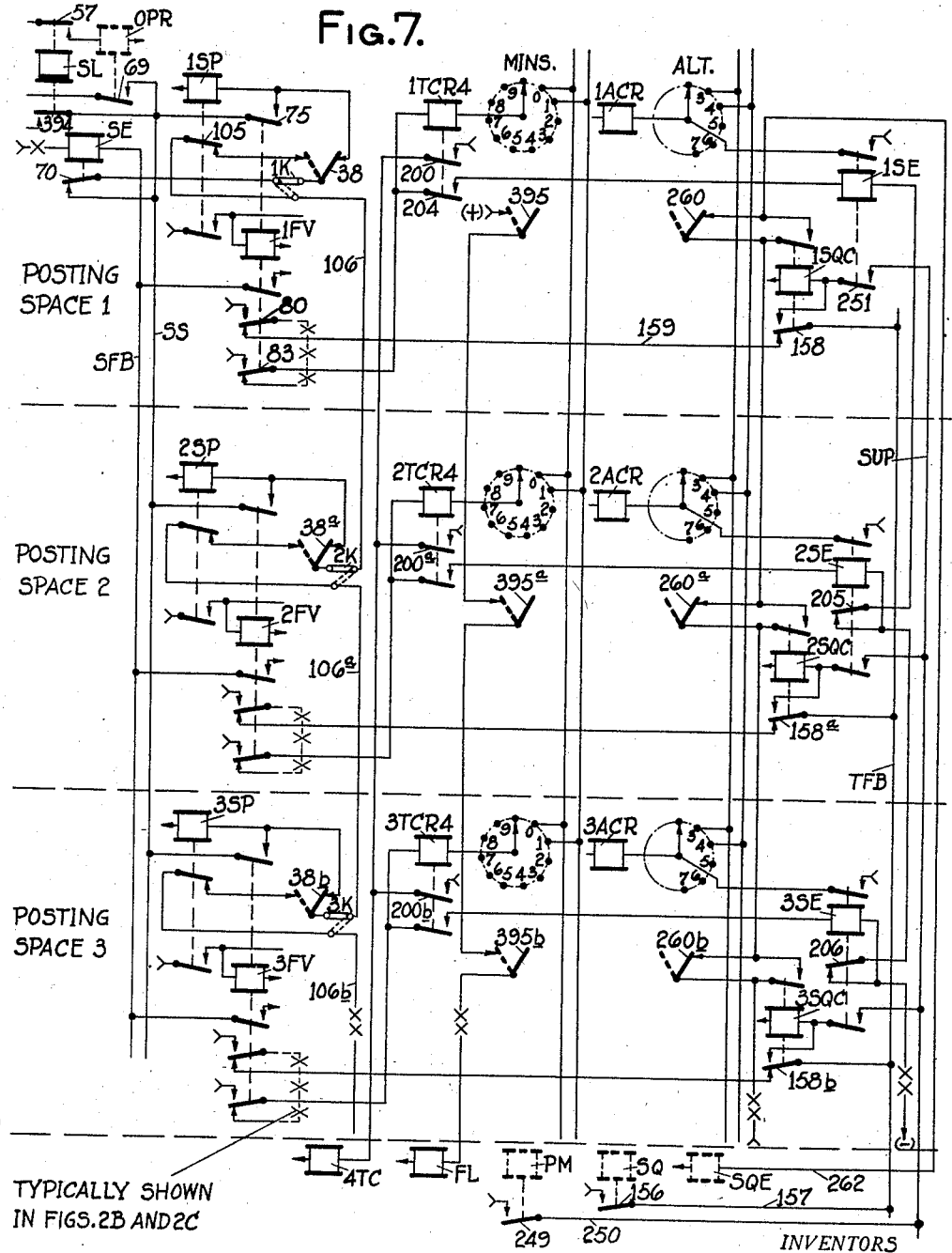

April 20, 1948.   N. D. PRESTON ET AL   2,439,948
AIRWAY TRAFFIC CONTROL SYSTEM
Filed Oct. 11, 1945   12 Sheets-Sheet 12

TYPICAL TELETYPE WIPE-OUT OPERATION
TAPE PUNCHED AND DECODED SAME AS
FOR POSTING - FOLLOWED BY

INVENTORS
N.D.Preston and F.B.Hitchcock
BY
Neil W. Preston,
Their ATTORNEY

Patented Apr. 20, 1948

2,439,948

UNITED STATES PATENT OFFICE 2,439,948

AIRWAY TRAFFIC CONTROL SYSTEM

Neil D. Preston and Forest B. Hitchcock, Rochester, N. Y., assignors to General Railway Signal Company, Rochester, N. Y.

Application October 11, 1945, Serial No. 621,778

31 Claims. (Cl. 177—353)

This invention relates to airway traffic control systems, and more particularly to an organization for posting and displaying data for scheduled flights in a suitable panel in the particular chronological order or sequence of their scheduled times.

The system of the present invention involves features of controlling a posting panel which may be considered as improvements over similar features in our prior application Ser. No. 528,926 filed March 31, 1944; and no claim is intended to be made in this application to subject matter common with such prior application. Furthermore, the complete organization contemplated in said prior application Ser. No. 528,926 also included features pertaining to the reception and decoding of Teletype messages similar to those disclosed in this application; but, it is to be understood that claims to such subcombinations are made in our continuing application Ser. No. 5,694 filed February 2, 1948.

In supervising and directing the movement of traffic on airways, more especially in connection with approach control and landing operations, it is very helpful to an operator to display before him the data for approaching scheduled flights, including suitable flight identification, scheduled time, altitude and the like, in the order or sequence of the scheduled times, so that the operator can readily see the particular order in which the various flights are scheduled to come under his jurisdiction, irrespective of the order in which the data for the respective flights is received or made available for his attention.

The primary purpose or object of the present invention is to provide a system organization for posting or storing the data for a number of flight schedules as and when such data becomes available, and for automatically sorting out and displaying in a suitable sequence panel the data for a number of such flights in the strict time sequence or chronological order of their scheduled times.

Generally speaking, and without attempting to define the nature and scope of the invention, it is proposed to provide a posting panel on which electrically operable changeable indicators in different rows or posting spaces may be set automatically in response to a manual control or messages received over Teletype facilities so as to display the desired data for scheduled flights, such as flight number identification, scheduled time, altitude and the like. This data for different flight schedules is posted in different posting spaces in any order that vacant spaces from one end of the panel happen to become available to receive such flight data, and independently of the sequence in which previously posted flight data has been posted.

After accumulation and display of the data for various flights in this manner and in an order which does not necessarily correspond with the chronological sequence of their scheduled times, it is proposed to provide an automatic time sorting and posting means, which is set into operation upon each change in the display of flight data in the posting panel either by the addition of data for some additional flight, or by a wipe-out of data for a flight disposed of, or in response to suitable manual control, as the operator may desire, and which acts automatically to sort over all of the flight schedules posted in the posting panel at the time and repost a predetermined number of these flight schedules by the positioning of like changeable indicators in a separate sequence panel in successive spaces from one end in the chronological order or time sequence of the scheduled times, so that the complete data for a desired number of scheduled flights is rearranged in the sequence panel in the order of their scheduled times for the guidance and information of the operator.

The proposed system also includes various other features in connection with this general plan of posting and time sequencing. Whenever posting of a new schedule for a flight is initiated, there is a provision for automatically selecting and revising the schedule for that same flight if already posted in the posting panel, or posting the new schedule in the first vacant space in the posting panel if there has been no prior posting for the same flight. Also, provision is made for automatically selecting and wiping-out the data for any identified flight when that flight is reported as having landed, or has otherwise been disposed of so as to be no longer of interest to the operator. These posting or wipe-out functions may be performed either by manual control, or by automatic control in connection with posting and wipe-out messages punched in a tape in connection with the reception and printing of such messages by the usual Teletype facilities, or like code communication system. In connection with such automatic posting and wipe-out under the control of Teletype messages, special provision is made to check the number of characters in these messages, and reject without any posting or wipe-out operation any message which is defective in the number of its characters. Also, any message including an error or correction code character is rejected by the posting apparatus. The existence of a defective message is automatically brought to the attention of the operator by a suitable alarm which enables him to take the appropriate action to bring about a proper posting or wipe-out operation.

It is also proposed to combine and interlock these various functions and features of operation for a system of this character in such a way as to perform the various manual or automatic functions in a way to afford a flexible and accurate system for posting and time sequencing flight data.

One important characteristic of the system organization of this invention as a whole is that the parts and circuits have been especially arranged to provide for the positioning of indicators and operation of other movable elements of the system in accordance with the normally closed circuit principle of failure on the side of safety, such that any broken wire, bad contact, or like circuit failure will not result in an erroneous setting of the indicators, but is at once automatically detected and manifested by an abnormal action of the system which brings the attention of the operator to the existence of such fault and enables him to take such action as is appropriate to the conditions to obtain a correct posting or wipe-out operation.

For example, in the system of this invention each of the changeable indicators and the multiple position contacts of the time sorting means is operated to the particular position called for by the energization of a control bus belonging to that position, as distinctive from being operated by a prescribed number of successive impulses that may or may not be effective; and if any indicator or contactor involved in an operation should fail to move, or should fail to stop in the proper position due to a broken wire, bad contact, or the like, the system stalls for that operation, instead of carrying out an erroneous operation. The operator, realizing that a fault has developed may manually clear out the stalled condition, and also take such other action in the way of emergency cut out of the vacant space selection, replacement of defective parts, or the like, as may be appropriate.

Various other objects, functions, attributes, and characteristic features of the invention will be in part apparent and in part pointed out, as the description of a specific embodiment of the invention progresses.

In describing the invention in detail, reference will be made to the accompanying drawings in which the various parts and circuits for one specific embodiment of the invention have been illustrated in a simplified and diagrammatic manner, more with the object of facilitating an explanation and understanding of the nature of the invention and its mode of operation, than for the purpose of showing in detail the construction and arrangement of parts that would be preferably employed in practice. In these drawings, various diagrammatic and conventional representations have been employed. The system includes a number of relays, mostly simple direct current operated neutral relays of the usual type and construction, with a number of contact fingers cooperating with make or front contacts, and with break or back contacts in the usual manner. In the interests of simplifying the showing of circuits, the contact fingers of the various relays have been shown conventionally either below or above the representation of the relay operating coil or winding and connected therewith with dotted lines, as is most convenient for showing the electrical connections; and these contact fingers are illustrated as being in the raised or horizontal position when the associated relay is energized and in an inclined or lowered position when the relay is deenergized. Also, in order to simplify the showing of circuit connections, arrows and symbols (+) and (—) are employed to designate connections to the opposite terminals of the operating battery or other suitable source of current, an operating circuit being established when a conducting path is available from a wire end having (+) and an arrow pointing toward a wire to some other wire end having (—) and an arrow pointing away from the wire. Various other diagrammatic or schematic representations on the drawings for the various devices will be explained as the description progresses. In describing the invention in detail, reference will be made to the accompanying drawings, in which like reference characters designate corresponding parts throughout the several views, and in which:

Fig. 1 is a general view illustrating the posting and sequence panels, together with the manual control board and other apparatus in block form;

Figs. 2A, 2B and 2C, when arranged side by side, illustrate the organization of parts and circuits for one typical posting space having a plurality of changeable indicators for the posting panel; another typical posting space for the sequence panel; and the associated relays and circuits for carrying out the posting, wipe-out and time sequencing functions;

Figs. 3A to 3D inclusive, when arranged side by side, illustrate the circuit organization for receiving and decoding Teletype messages to be used with the posting and wipe-out circuit organization of Figs. 2A to 2C;

Figs. 4 and 5 illustrate the punchings in the tape for typical posting and wipe-out messages respectively;

Figs. 6A to 6E are explanatory diagrams indicating generally the sequence of relay operations involved in certain typical operations of the system;

Figures 6E, 8:
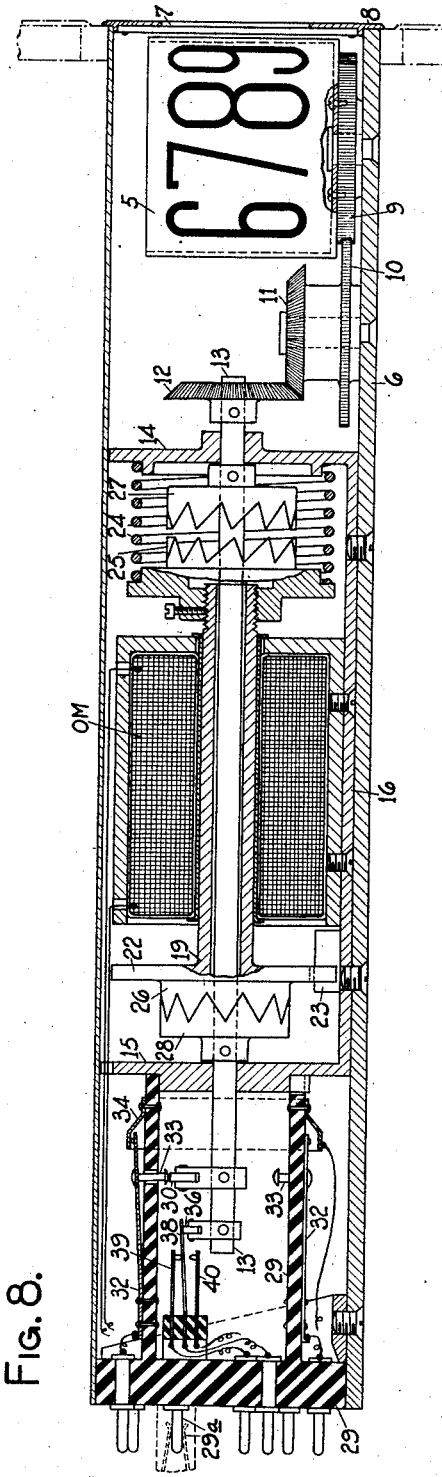

Fig. 7 is a fragmentary circuit diagram illustrating certain interconnecting circuits between the indicator units and relays for a plurality of spaces of the posting panel; and Fig. 8 illustrates the structure of one type of changeable indicator disclosed in our prior application, Ser. No. 528,926, filed March 31, 1944, and assumed to be used for the particular arrangement of circuits illustrated as an embodiment for this invention.

*General organization*

Before discussing in detail certain typical examples of the contemplated operation of the system, it will be helpful to consider generally the nature and the character of some of the component parts of the system, and explain some of their operating characteristics.

*Posting panel.*—The posting panel shown generally in Fig. 1 comprises a suitable frame structure for housing and supporting a number of horizontal rows of electrically operable changeable indicators, each movable from an initial or blank position to a selected operated position, to display by figures or the like the desired data for a flight. Each of these rows of indicators, constituting what is conveniently termed a posting space, comprises a plurality of indicators suitable for displaying the desired data. As illustrated, there are two indicators for the two digits of a number for flight identification, four indicators for the four denominations of time of a 24-hour day, and one indicator for altitude; but the organization of circuits may be adapted to any desired number of indicators affording the desired information with respect to a flight.

The posting panel may include any desired number of posting spaces or rows of indicators, as may be considered necessary to provide a display of data for an adequate number of approaching flights needed for the information and guidance of the operator. The number of posting spaces in the posting panel does not limit the number of posting messages that may be received over the Teletype facilities, because posting messages in excess of the capacity of the panel may be stored in the punched tape record and used when posting spaces become available.

*Changeable indicators.*—The changeable indicators in the posting panel may take any suitable form having multiple position contacts and operating means; but in connection with the particular circuit connections shown, it is assumed that these indicators will be of the self-propelled step-by-step type, such as disclosed in our prior application, Ser. No. 528,926, filed March 31, 1944.

This type of changeable indicator, illustrated for convenient reference in Fig. 8, comprises an indicator drum 5 mounted to turn on a vertical axis and supported by the lower frame member 6 of the indicator unit. The numbers or other desired symbols on the periphery of this drum 5 are exhibited in its different positions through an opening 7 in a suitable mask forming the front plate 8 of the unit. This indicator drum 5 is connected by spur gears 9 and 10 and beveled gears 11 and 12 to an operating shaft 13 extending longitudinally of the unit, and supported in the end members 14, 15 of the support 16 of an operating element fastened by screws to the frame member 6. The core 19 of an operating magnet or solenoid OM carries an armature 22 which has a notch cooperating with a fix stop 23 to prevent turning movement of the core. The core 19 is biased to the left by a coil spring 24, and carries two discs 25 and 26 cooperating with toothed collars 27 and 28 respectively, fixed to the operating shaft 13, so that as the operating magnet OM is energized to attract the armature 22 to the right, the teeth on the disc 25 cooperate with the teeth on the collar 27 to turn the operating shaft 13 approximately half way to the next position, and upon deenergization of the operating magnet OM, the spring 24 restores the core 19 to the normal position shown and causes the teeth on the other disc 26 to cooperate with the teeth on the other collar 28 to turn the operating shaft 13 to the next active position of the indicator. Thus, as the operating magnet OM is intermittently energized, the operating shaft 13 and the indicator drum 5 are moved step-by-step.

The number of active indicating positions for each indicator depends upon the data it is intended to display, there being a blank position and ten active positions for the indicators representing the different digits of flight number and the unit minutes, and a smaller number of active positions for the indicators representing the tens of hours, hours and tens of minutes. The indicator illustrated in Fig. 8 has a blank position and ten active positions. The number and spacing of the teeth on the discs 25 and 26 and the collars 27 and 28 may be varied to suit the number of active positions of the indicators, or the same indicator may be used in each case with idle movement past unused positions.

Each changeable indicator includes a set of position contacts, which, as shown, comprises contact fingers 32 arranged around a cylinder 29 of insulated material like the staves of a barrel and operated from the inside by a roller 30 on an arm fixed to the operating shaft 13. As the indicator drum 5 assumes its different positions the roller 30 engages a pin 33 on a contact finger 32 for the corresponding position to move that contact finger outwardly against its spring bias.

These contact fingers 32 engage a continuous conducting sleeve 34 secured to the insulated cylinder 29, so as to complete circuits one for each position of the indicator.

The indicators are also provided with empty-full contacts which comprise a movable finger 38 operated by a roller and arm 36 on the operating shaft 13, and moved from one extreme position to the other to engage different stationary contacts 39 and 40 as the indicator is moved into and out of the blank position. In some cases, these empty-full contacts can be omitted.

The indicator unit as a whole is preferably provided with a detachable plug connection for its connecting circuits, as indicated at 29a, so that it may be readily removed from the front panel for replacement purposes.

It may be pointed out here that the same type of step-by-step indicator device is used for the units of the time sorter, with or without indicating drums, as desired.

Figure 2B:
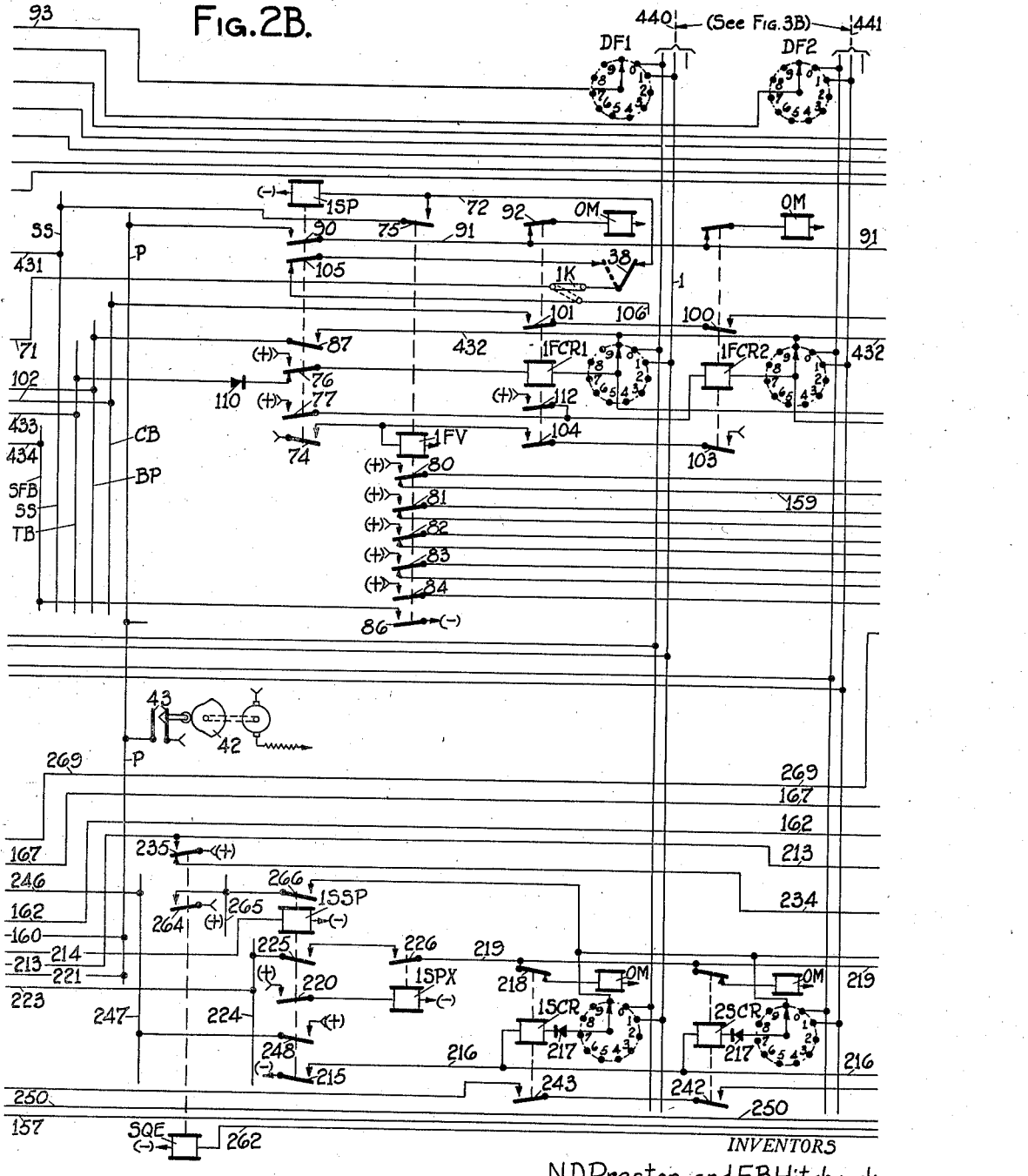

It is contemplated that these changeable indicators will be operated from a master pulsing bus P which is intermittently energized in a suitable manner, such as by a motor-driven cam 42 operating contacts 43, as shown in Fig. 2B, so as to provide the duration and spacing of energization of the operating magnets OM of the various indicators best suited to their rapid and accurate operation. Each changeable indicator is set into operation and stopped in the selected position by controlling the connection between its operating magnet OM and this master pulsing bus P in a manner more conveniently considered later in discussing the detail operation.

In the circuit diagrams these changeable indicators are shown diagrammatically, with the operating magnet OM in block form, and the position contacts represented as a rotating arm engaging stationary contacts connected to control buses. In reviewing the circuit connections, it should be understood that when the operating magnet OM for any one of the indicators is intermittently energized, the contact arm is assumed to be moved clockwise from its blank vertical position in a step-by-step operation to its different contact positions, until the indicator has assumed a position corresponding with an energized control bus, in which an associated correspondence relay, such as the relay IFCRI for the first digit of flight number in the first posting space in Fig. 2B, is energized to open the circuit for its associated operating magnet OM and discontinue any further intermittent energization of such operating magnet OM. Since the contacts for each different position of an indicator become closed upon deenergization of its operating magnet OM at the end of a pulse, the associated correspondence relay is immediately picked up if that position is connected to an energized bus, thus assuring that the contact arm and associated indicator drum will remain in such set position because the picking up of the correspondence relay opens the circuit for the associated operating magnet OM before the next pulse occurs.

*Time sequencing apparatus.*—The sequence panel comprises changeable indicators arranged in rows or posting spaces the same as for the posting panel, and is in effect a supplemental or additional posting panel into which flight data from the posting panel may be reposted in the proper time sequence. Under ordinary conditions, it is likely that a smaller number of posting spaces in the sequence panel than in the main posting panel will provide the necessary information for the operator; and for the purpose of illustration it has been assumed that the sequence panel will include a limited number of posting spaces, such as four. However, it should be understood that any suitable number of posting spaces may be provided in the sequence panel; and in some cases it may be desirable to have the same number of spaces in the sequence panel as is provided in the posting panel.

The order in which the postings are made in the sequence panel in succession either from the top down as shown, or from the bottom up, as may be desired, is determined by the operation of a multiple position stepping contactor, conveniently termed a space selector, which is shown diagrammatically in Fig. 2A as comprising two contact arms 134 and 135 moved to step and half-step positions by a suitable stepping mechanism STM.

The time sorter comprises four similar multiple-position contactor units, one for each denomination of time for a 24-hour day, which are arranged to be operated from the master pulsing bus P sequentially under certain conditions, and which have their positions determined by the energization of the groups of time control buses associated with the time indicators in the posting panel. These time sorter units, relating to tens of hours, unit hours, tens of minutes and unit minutes denominations of time for a 24-hour day, and shown schematically in Fig. 2C, have been designated for convenience THS, UHS, TMS and UMS, and are connected to and governed by a corresponding group of time units. Aside from the different number of active positions required on account of the varying number of digits in the different denominations of time each of these units are constructed and operated in the same way, and for convenience are assumed to have the same construction as a changeable indicator unit, such as shown in Fig. 8, with or without the indicating drum, as desired.

Associated with each of these time sorter units, and functionally forming a part thereof, is a clear-out relay such as ICO, 2CO, etc., and a time correspondence relay such as ITC, 2TC etc. The functions of these relays and the control circuits involved are more conveniently considered later in discussing typical operations.

The system is illustrated in a condition such that any posting or wipe-out operation either manual or automatic will initiate a sequencing operation. If desired, however, such automatic initiation of the sequencing operation can be stopped at the will of the operator by actuating the sequence control lever ISL of Figs. 1 and 2A to an operated position. Under such a condition, the sequencing operation will take place only when manually initiated by the operation of the sequence button SQB. On the other hand, the lever ISL can be left in its normal position illustrated and the lever 2SL moved to an operated position thus causing the sequencing operation to take place automatically following each wipe-out operation but not following a posting operation. Then the operator can allow one or more posting operations to occur before he manually initiates the sequencing operation, it being understood that the operator can, of course, initiate a sequencing operation at any time by actuating the button SQB. During each sequencing operation, regardless of how it is initiated, the indicator lamp SQK is illuminated to advise the operator that such a sequencing operation is taking place and when such operation has been completed.

*Posting and wipe-out facilities.*—In accordance with this invention, provision is made for the posting or wiping-out of flight data in the posting panel either by manual setting and control, or automatically by Teletype messages recorded on a punched tape.

Either of these posting and wipe-out facilities accomplishes the necessary functions; but it is contemplated that ordinary operating conditions make it desirable to employ both manual and automatic posting and wipe-out facilities. For example, when the posting and time sequencing organization of this invention is used in connection with approach control or landing procedures, it is likely that information regarding certain flights will be communicated to the central office, from one or more outlying fix locations at which the approaching flights are observed, by Teletype facilities or the like, while the approach of other flights may be communicated to the central office from some outlying point by telephone, or perhaps directly by radio from the pilot of the flight. Although such incoming messages or information, regardless of its origin or mode of communication, could be manually posted in the posting panel, it is contemplated that many of the messages of flight data will come from outlying fixes where Teletype facilities are available, so that it is advantageous in the interests of saving manual effort and avoiding human error to utilize such Teletype facilities to make the posting and wipe-out operations automatically, reserving the manual posting and wipe-out operation for the use of the operator to take care of other conditions. For these reasons the organization of this invention, as disclosed comprises suitably interlocked manual and automatic posting and wipe-out facilities.

The equipment for manual posting comprises suitable manually operable setting dials shown diagrammatically in Fig. 1 for flight number DF1, DF2, for scheduled time DT1, DT2, DT3 and DT4, for altitude DA, and the like, together with a push button PB for initiating posting operation. These setting dials are merely representative of any suitable form of manually operable selecting circuit controllers; and may be key set devices or the like. As shown, separate flight number setting dials WDF1 and WDF2 together with a push button WOB are employed for the wipe-out operation, on the assumption that separate dials and initiating button for this purpose enable the wipe-out function to be performed by a separate operator if so desired, and also because the use of separate flight number dials for performing the wipe-out function is less likely to result in careless or wrong manipulation.

The facilities for receiving and decoding Teletype messages for performing the posting and wipe-out operations automatically, as illustrated in Figs. 3A through 3D, comprise a selecting or routing means associated with the conventional Teletype receiver and distinctly responsive to different codes to route the wipe-out and posting Teletype messages to two separate tape reperforators (i. e. a posting reperforator and a wipe-out reperforator), so that the posting and wipe-out messages are punched in separate tapes, thereby permitting the use of the wipe-out messages at any time independently of the number of preceding posting messages. Thus, even though the posting panel is full, and additional posting messages may have been received and stored in the tape, the reception of a wipe-out message on a different tape is effective to wipe-out a posting in the posting panel. Associated with each of the tape reperforators is a tape feed mechanism, a distributor and a plurality of decoder units, one for each character of the flight data, such as the different digits of flight number, denominations of time and altitude.

The control panel of Fig. 1 also includes indication lamps NPK, PK and WOK, which lamps are normally illuminated. The lamp NPK is extinguished whenever a posting or wipe-out operation (either manual or automatic) fails to be completed within a limited time. The lamp PK is extinguished whenever an automatic posting operation fails to be completed within a limited time after its initiation or the punched record of a new schedule being posted includes an improper number of codes; the lamp WOK is similarly controlled so as to be extinguished if an automatic wipe-out operation is not completed within a limited time after its initiation or if the message recorded on the tape includes an improper number of codes. Whenever one of these indicator lamps is extinguished, an audible signal is given to draw the operator's attention to such fact; but this audible signal may be stopped if the operator so desires by actuation of the silencing lever or stay-where-put key SIL. This lever or key SIL is provided so that in the event of some failure being indicated, the audible signal may be silenced until after the fault in the system has been located and eliminated, after which the lever SIL is restored to its normal condition. If the fault indicated by one of the lamps and by the audible signal is immediately apparent, the operation of clear-out button COB will cause the restoration of the system to a normal condition in which the indicator lamps are re-illuminated and the audible signal is silenced without operation of lever SIL.

The system organization includes various other devices and relays which are more conveniently considered in discussing typical operations of the system.

General operation

It can be appreciated that a system of this character operates differently in detail respects for the large number of different combinations of figures for flight data, the number and order of posting and wipe-out operations for the different flights from time to time, and other varying conditions. In describing the circuits and operation in detail, it is necessary to consider certain typical operations of the system on the basis of certain assumptions with respect to the flight number, time and the like; but an explanation and understanding of these typical operations will serve to make clear how the system will operate for various other conditions of posting, wipe-out, and the like for other flight numbers, times, etc.

Figure 6A:
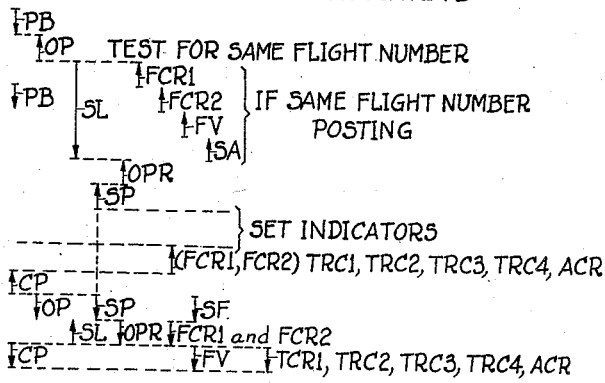

*Manual posting.*—For the purpose of explaining the operation of positioning the indicators of a selected space in the posting panel, in accordance with the data for some flight to be posted, it is convenient to assume that the operator receives by telephone from some point, or by radio from the pilot of a flight the information for the posting to be made. The operator first positions the flight number, time and altitude setting dials DF1, DF2, etc. on the control board in Figs. 1, 2B and 2C to conform with the data to be posted, and then actuates the posting button PB. The resultant sequence of relay operations is indicated in the sequence diagram Fig. 6A; and the circuits involved in this operation will now be explained in detail with reference to Figs. 2A, 2B and 2C.

The actuation of the button PB establishes an energizing circuit for the relay OP in Fig. 2A which may be traced from (+) through button PB, back contact 48 of relay WOR, relay OP, back contacts 49 and 50 of relays 1STR and STR, back contact 51 of completion relay CP, clear out button COB, and back contact 52 of sequencing relay SQ, to (—).

The relay OP closes its front contact 54 to provide a stick or locking circuit independently of the button PB.

The energization of the relay OP opens at its back contact 56 a circuit for a slow-releasing relay SL readily traced from (+) through back contact 55 of relay AOP and back contact 56 of relay OP; and after the release time for the relay SL, during which certain other operations may occur as later described, the relay OPR is energized by a circuit from (+), through back contact 55 of relay AOP, front contact 56 of relay OP, back contact 57 of relay SL, relay OPR, to (—).

The energization of relay OP and closure of its front contacts 60 and 61 connects (—) to the flight number setting dials DF1 and DF2 in Fig. 2B, and the energization of relay OPR and closure of its front contacts 62 through 66 connects (—) to the time and altitude setting dials DT1, DT2, DT3, DT4, DA in Fig. 2B, thereby rendering the existing positions of these setting dials effective to determine the energization of the associated groups of control buses.

The energization of relay OP completes a circuit for vacant space selection which may be traced from (+), through back contact 68 of completion relay CP, front contact 69 of relay OPR, back contact 70 of the same flight relay SF, wire 71, cut out switch 1K, to the empty-full contact 38 of an indicator for the first space. Assuming this space to be vacant, so that the empty-full contact 38 is in the position shown, current may then flow over wire 72 through the winding of the space relay 1SP for this space to (—).

The energization of the space relay 1SP for the first space assumed to be empty, closes its front contact 74 to energize a relay 1FV over an obvious circuit, which closes its front contact 75 to provide a stick circuit for the space relay 1SP to space stick bus SS and maintain relay 1SP energized independently of the empty-full contact 38 and the back contact 70 of the same flight relay SF because bus SS is directly connected to front contact 69 by wire 431.

The closure of front contacts 76 and 77 of the space relay ISP connects (+) through the flight number correspondence relays IFCRI and IFCR2 to the position contacts of these indicating units. Similarly, the energization of the relay IFV and closure of its front contacts 80 through 84 connects (+) to the correspondence relays ITCRI, ITCR2 etc. for the four denominations of time and also to the correspondence relay IACR for the altitude indicator.

The energization of the flight verification relay IFV and closure of its front contact 86 also permits energization of the same flight relay SF by a circuit from (+), back contact 85 of relay CP, relay SF, wire 434, same flight panel bus SFB, front contact 86 of relay IFV, to (—); but the energization of the same flight relay SF under these conditions and at this time does not affect the operation under consideration of making a posting in a selected vacant space, but is significant in connection with posting revised flight schedules and the wipe-out operation, as later explained.

Also, the closure of the front contact 90 of the space relay ISP connects the master pulsing bus P to the space pulsing bus 91 for the space in question, which is connected to the operating magnets OM of each of the indicators through back contacts of the associated correspondence relays, such as the back contact 92 for the correspondence relay IFCRI for the first digit of flight number.

Thus, the operating magnets OM for each of the indicators in the particular selected space under consideration are set into operation to move their indicator drums from the blank positions clockwise as shown, and actuate their position contacts to connect the associated correspondence relays IFCRI, IFCR2, etc. in turn to the different numbered buses of the associated group of control buses.

In this connection, it will be noted that the bus 432 extending from the blank positions of the indicators in the space in question is connected through front contact 87 of the space relay ISP to a blank position bus BP for the panel, which in turn is normally connected through back contacts 88 and 89 of relays OP and AOP to (—), but the circuit thus provided is opened by the energization of the relay OP during the manual posting operation under consideration, so that the correspondence relays IFCRI, IFCR2, etc. for these indicators cannot be energized with the indicators in the initial or blank positions. In this way, the indicators are caused to be moved to the particular positions called for by the energization of the control buses.

Assume, for example, that the first digit of the flight number to be posted is 1, and the setting dial DFI is in the position 1 to connect (—) through front contact 60 of relay OP to the control bus I of the group of buses belonging to said first digit of the flight number. When the indicator in the first space has been operated by its operating magnet OM to the position to display 1, a circuit to energize the correspondence relay IFCRI is established, thereby energizing this relay to open at its back contact 92, the connection between its operating magnet OM and the space pulsing bus 91, so that this indicator stops in the position corresponding with the position of the setting dial DFI.

This energization circuit for the correspondence relay IFCRI in the case just assumed may be traced from (+), through front contact 76 of space relay ISP, relay IFCRI, indicator in position 1, control bus I, setting dial DFI in position 1, wire 93, front contact 60 of relay OP, to (—).

It can be seen that if the indicator should fail to move, or if there is a bad contact or broken wire involved in the control bus circuit for this position 1, the correspondence relay IFCRI is not energized, and stepping operation of the indicator continues.

The operation just described in detail for the first digit of the flight number is characteristic of operations of all of the indicators, which are moved in a similar manner to the particular position called for by the energization of the associated control bus, whereupon the indicator is stopped by energization of its associated correspondence relay.

After all of the indicators for this space in question have operated properly to the positions called for, so that all of the correspondence relays IFCRI and IFCR2, ITCRI, etc., are energized, a completion circuit is established which may be traced from (+), in Fig. 2C through the front contacts 95 through 101 in series of the correspondence relays IACR, ITCR4, etc. to a completion bus CB for the panel, thence over wire 102, completion relay CP, to (—).

The energization of the completion relay CP upon completion of the positioning of the indicators in their new positions and the opening of its back contact 51 opens the stick circuit before described for the relay OP. The opening of the back contact 68 of this relay CP opens the stick circuit of space relay ISP, and back contact 85 opens the energizing circuit for the same flight relay SF.

The release of the relay OP acts to open its front contacts 60 and 61 and disconnect (—) from the flight number setting dials, while the release of the space relay ISP acts to open its front contacts 76 and 77 to disconnect (+) from the flight number correspondence relays IFCRI and IFCR2, which deenergizes these correspondence relays to open their front contacts 100 and 101 and release the completion relay CP.

The release of the space relay ISP opens at its front contact 90 the connection from the master pulsing bus P to the pulsing bus 91 for the space in question, prior to the release of the correspondence relays IFCRI and IFCR2, so that there is no operation of the associated operating magnets OM to disturb the position of these indicators. The release of the relay OPR following the release of relay OP disconnects (—) from the time and altitude setting dials to release the correspondence relays ITRCI, ITRC2, etc., for the time and altitude indicators; and these correspondence relays drop at about the same time that relay CP drops and the relay IFV is released due to the opening of the front contacts 103 and 104 of the correspondence relays IFCRI and IFCR2, as indicated in the sequence diagram of Fig. 6A.

Thus, the various relays operated during this posting operation are restored to their normal conditions shown, ready for a subsequent operation; and the indicators in the selected space are left in their operated positions to display the desired flight data. These indicators are held in their operated positions by the locking action of the teeth on the collar 26 in engagement with the teeth on the disc 28 as shown in Fig. 8.

*Vacant space selection.*—If it should happen that the first space of the posting panel, i. e. the top space in the particular arrangement shown, is already filled with a flight schedule, the empty-full contact 38 of this space is moved from the position shown to the dotted line position; and referring to Fig. 7, current then flows through this empty-full contact 38 in its dotted line position through a back contact 105 of the space relay ISP, and wire 106 to the emergency switch 2K and empty-full contact 38a for the next space below. If this space is empty, then the relay 2SP is energized, but if this space should also be full, the vacant space selecting circuit continues in a similar way to the next space below, and so on, until a vacant space is reached and the space relay for that space is energized.

Thus, the first vacant space in the posting panel is automatically selected to receive the new flight schedule data; and the indicators of that space alone are those which are operated in accordance with the existing energization of the control buses. As illustrated, this vacant space selection operates from the top down, but it can be readily seen that the feed connections may be changed to provide for vacant space selection from the bottom up.

It will be noted that this scheme of vacant space selection is entirely automatic, and does not require any manipulation on the part of the operator to pick a space into which the schedule data shall be posted. It should perhaps be pointed out that, if the flight schedules are posted and wiped out properly in the order of their scheduled times, these schedules may appear in proper time sequence in the posting panel to a limited extent, that is, in groups. For example, starting with the posting panel empty, the first schedules posted prior to any wipe-out will appear in the spaces in the order posted, and will be in time sequence if the schedules are posted in the order of their scheduled times. However, as soon as one of these schedules, presumably the one with the earliest schedule of time, has been wiped out, a vacant space exists and the next new schedule will be routed into this vacant space by the vacant space selecting circuit. If the wipe-outs should then occur as fast as new schedules are posted, a new group of schedules in time sequence might appear in the posting panel.

However, it is contemplated that the forecasts of scheduled times of arrival of flights will be known or reported to the central office by Teletype facilities, from time to time as and when such forecasts are made, and probably in a quite different order than the actual time sequence of these forecasted or scheduled times. Also, there is not necessarily any relation in the rate at which flights are disposed of and their posted schedules wiped out, and the rate at which new time schedules may be determined or received at the central office. Consequently, the schedules posted in the posting panel automatically on some arbitrary basis, such as the selection of the first vacant space as here proposed, will ordinarily appear in an indiscriminate and variable order with respect to the scheduled times; and since it is tiresome and difficult to pick out by visual inspection from such a display of flight data the particular flight or flights arriving first and requiring attention, the time sequencing feature of this invention is of great aid to an operator.

*Automatic revision of posting.*—It may happen that after a given flight has been reported, and posted to arrive at a certain time, it becomes necessary for some reason to change this scheduled time, or perhaps the altitude. In accordance with this invention, the posting of a revision of an existing schedule for some flight is made entirely automatically. This not only avoids the need for a special wipe-out control, as later explained, to eliminate the old data when the revised schedule is to be posted, but also assures that there will not be more than one schedule in the posting panel for a given flight number.

Considering this situation where the data set up on the setting dials represents a revision of the schedule for the same flight already having its data posted, assume for purposes of explanation that the flight number setting dials DF1 and DF2 are set to energize the control buses 1 for both groups of flight number buses to correspond with a flight number 11, and that the same flight number 11 is posted in the first space shown in Figs. 2B and 2C, so that the flight number indicators for this space are in position 1.

When the relay OP is energized by actuation of the posting button PB, as previously explained, and the closure of its front contacts 60 and 61 connects (—) to the flight number setting dials, the closure of front contact 109 of relay OP also supplies (+) through wire 433 to the test bus TB and allows current to flow through a rectifier 110, back contact 76 of space relay ISP, correspondence relay IFCR1 for the first digit of flight number through the corresponding position contacts assumed to be in position 1, control bus 1, through the setting dial DF1 in position 1, wire 93 and front contact 60 of relay OP, to (—), thereby energizing relay IFCR1, since the first digit of the flight number posted in the space in question corresponds with the first digit set up on the setting dials.

This energization of relay IFCR1 closes its front contact 112 to connect (+) to the correspondence relay IFCR2 for the second digit of the flight number, and if the position of this indicator corresponds with that of the setting dials, as in the case assumed, this other correspondence relay IFCR2 is also energized. Simultaneous energization of both of the flight number correspondence relays IFCR1 and IFCR2 closes a circuit through their front contacts 103 and 104 to energize the flight verification relay IFV, thereby closing its front contact 86 to energize the same flight relay SF over the circuit including the same flight bus SFB, wire 434 and back contact 85 of relay CP.

Since the unit for each posting space is similar to the one shown, it will be apparent that the test bus TB provides positive energy for the first digit flight number correspondence relay of each posting space. Thus, regardless of the particular posting space in which the same flight number is posted, the flight verification relay FV for that space is picked up. With this organization it is apparent that should several posting spaces have the same number in the first digit of flight number, the correspondence relay FCR1 for these posting spaces would be picked up and supply positive energy (+) to the correspondence relay FCR2 for the corresponding second digit of flight number. But since it is assumed that only one flight will be given any particular number it will be apparent that the correspondence relay FCR2 for the second digit will be energized for only that particular posting space having the same flight number as that set up on the flight number setting dials DF1 and DF2. For this reason the flight verification relay FV will be picked up in the manner described for only the posting space having the same flight number.

This operation of checking the postings to determine if the same flight number appearing on the setting dials is already set up in some posting space, occurs while the relay SL is releasing and the energization of the relay SF opens at its back contact 70 and the vacant space selecting circuit before the relay OPR is energized to close its front contact 69 and apply energy to this circuit. Thus, if the same flight number appears in an existing posting space, the vacant space selecting circuit is opened prior to the energization of a space relay for the next vacant space. The relay, however, is energized at this time for the space having posted therein the same flight number, which in the case assumed is relay IFV for the first space, and the closure of its front contact 75 permits energization of the corresponding space relay such as ISP as soon as relay SL releases and effects the picking up of relay OPR to close front contact 69.

The energization of the space relay in which the same flight is posted, such as the relay ISP, causes operation of the indicators of that space to correspond with the setting of the setting dials, so that the schedule posted in such posting space is revised accordingly.

In other words, in accordance with this invention, when a posting operation is initiated, there is first a period during which the existing schedules are checked to determine if data for the same flight number has been previously posted; and if such is the case, the vacant space selection is rendered ineffective, and the particular space including such data is selected as the one to have its indicators operated. If there is no existing posting for the same flight number, then after the relatively short test period, the vacant space selecting circuit acts to route the new flight schedule to the first vacant space.

Automatic posting of a new or revised flight schedule will result in a similar way upon energization of a relay AOP in connection with receiving and decoding Teletype posting messages, as more conveniently explained later.

*Manual wipe-out.*—When a flight having schedule data posted in some space of the posting panel has landed or is otherwise disposed of, this data is no longer of interest to the operator, and should be removed from the posting panel by an operation conveniently termed a wipe-out operation. This wipe-out operation involves selection of the particular space in which the posting to be wiped out appears, and then causing the indicators for this particular space to be operated to their blank positions.

Although this wipe-out operation is performed in the organization disclosed, either in response to the manual setting of flight number dials and actuation of a wipe-out button, or automatically in response to a wipe-out message received over a Teletype system, it is convenient to limit consideration at this point to the manual wipe-out operation.

For a manual wipe-out operation, the flight number for the schedule data to be wiped out is set up manually by manipulation of suitable flight number setting dials or a key set device; and for reasons already noted, it is considered preferable to employ a separate set of flight number setting dials WDF1 and WDF2 for this purpose, although, it should be understood that the same means for setting up a flight number designation may be employed for both posting and wipe-out operation.

When these flight number setting dials WDF1 and WDF2 for wipe-out have been positioned, which may be done by a separate operator at any convenient location, this operator actuates a push button WOB to energize a wipe-out relay WOR in Fig. 2A, subject to an interlock against conflicting operations, by a circuit which may be traced from (+), button WOB, relay WOR, back contact 115 of relay OP, back contacts 49 and 50 of relays ISTR and STR involved in automatic posting and wipe-out operations, back contact 51 of a completion relay CP, normally closed contact of a cancel or clear-out button COB and back contact 52 of a sequence relay SQ to (—).

Figure 6B:
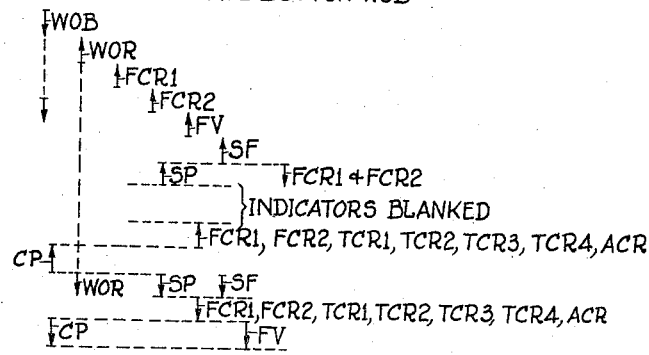

Fig. 6B shows the resultant relay operations. In the first place, the energization of relay WOR closes its front contact 116 to provide a stick circuit for maintaining it energized independently of the push button WOB.

The energization of the relay WOR also connects (—) through its front contacts 117, 118 and back contacts 119 and 120 of the same flight relay SF to the flight number setting dials WDF1 and WDF2 for wipe-out; and at the same time the closure of the front contact 122 of the relay WOR connects (+) through wire 433 to the test bus TB. Assuming for the purposes of explanation that the posting for a flight number 11 appears in the posting space illustrated, so that the flight number indicators are setting in position 1, the same as the existing positions of the flight number setting dials, upon energization of the relay WOR, the correspondence relay IFCR1 for the first digit of the flight number is energized over a circuit from (+) through front contact 122 of relay WOR, wire 433, test bus TB, rectifier 110, back contact 76 of space relay ISP, relay IFCR1, indicator in position 1, control bus 1, setting dial WDF1 in position 1, front contact 118 of relay WOR, back contact 120 of relay SF, to (—).

A correspondence relay for the first digit of the flight number, such as IFCR1, may also be energized for other posting spaces having flight numbers with the same first digit; and for each of these other spaces, as well as for the space illustrated, in which the flight number to be wiped out is assumed to be located, the energization of the correspondence relay such as IFCR1 and closure of its front contact 112 connects (+) to the correspondence relay, such as relay IFCR2, for the second digit of the flight number. If this second digit of the flight number as posted, as well as the first digit, corresponds with that set up on the setting dials, which is true only for the schedule data to be wiped out, then the correspondence relay such as IFCR2 is energized over a circuit similar to that described for the energization of the correspondence relay IFCR1 for the first digit of the flight number. Thus, both correspondence relays, such as IFCR1 and IFCR2, for the particular space containing the posting to be wiped out are energized to close their front contacts 103 and 104 and energize the flight verification relay, such as relay IFV, for that particular space. The same principles of selection may be carried out for as many flight number digits as desired.

The energization of the flight verification relay, such as relay IFV, for the particular posting space containing the data to be wiped out, and closure of its front contact 86 causes energization of the same flight relay SF to close its front contact 70 and cause energization of the space relay for the space in question. Under the conditions assumed where data is to be wiped out of the first posting space, relay 1SP is energized by a circuit which may be traced from (+) through back contact 68 of completion relay CP, front contact 124 of relay WOR, front contact 70 of relay SF, wire 431 to the space selecting bus SS, front contact 75 of relay 1FV, space relay 1SP, to (—).

The energization of the space relay 1SP initiates stepping operation of the associated indicators in the regular way previously explained; and since relays OP and OPR are deenergized to interrupt at their front contacts 60, 61 and 62 through 66 any connections to the control buses through the posting setting dials of Figs. 2B and 2C, and the energization of relay SF and opening of its back contacts 119, 120 disconnects (—) from the flight number control buses through the wipe-out flight number setting dials of Fig. 2A, and also since the blank position bus BP is connected to (—) through the back contacts 88 and 89 of the relays OP and AOP each of the indicators for the space in question are operated around to the initial or blank position, before being stopped.

When all of the indicators have been thus operated to the blank position to cause energization of all of the associated correspondence relays, such as relays 1FCR1, 1FCR2, 1TCR1, 1TCR2, etc. the closure of the front contacts 95 through 101 of these relays energizes the completion bus CB and picks up the completion relay CP to open at its back contact 51 the stick or holding circuit for the relay WOR including its front contact 116, thereby deenergizing this relay WOR and restoring the parts to the normal condition.

A similar wipe-out operation occurs upon energization of the relay AWO in connection with the automatic wipe-out in response to a Teletype message in a manner more conveniently considered in detail later.

*Posting or wipe-out failures.*—In a system of this character, it is important that any attempted posting or wipe-out operation, either manual or automatic, should be properly completed, otherwise the postings of flight schedules may be erroneous or incomplete, and create dangerous conditions or at least cause confusion.

From the foregoing explanation, it can be seen that the indicators in any selected space in the posting panel during any posting or wipe-out operation are positively operated to the position called for by the closure and energization of circuits including the control buses, and that such positive positioning for all of the indicators must occur before the various correspondence relays, such as 1FCR1, 1FCR2, etc., associated with these indicators, can be energized to pick up the completion relay CP. In this way, it is assured that all of the indicators are accurately set to the prescribed positions, and if any indicator should fail to move from its existing position, or should not be stopped in the proper position, due to a bad contact, broken wire, or the like, the associated correspondence relay is not energized, there is no energization of the completion relay CP, and the system stalls, so to speak.

A similar condition may arise if a wipe-out operation is initiated for a setting of the flight number of identification when this particular flight number does not appear in the posting panel, due to some error in identification of the flight or otherwise, since the same flight relay SF is not energized under such conditions, and there is no blanking movement of the indicators in any space to cause energization of the completion relay CP.

In these cases, it is desirable that such faulty operation should be brought to the attention of the operator to enable him to determine the nature of the trouble and correct it if possible. Any suitable alarm or warning signal may be provided for this purpose; but in the arrangement illustrated, a slow-release no-posting relay NP (Fig. 2A) is arranged to extinguish an indicating lamp NPK on the control board and sound a suitable buzzer BZ by operation of its contact finger 127 until proper operation is restored. The buzzer BZ can be silenced by the operator when recognized by operation of the silencing lever or key SIL.

Referring to Fig. 2A, this no posting relay NP is normally energized by an obvious circuit including in series back contacts 128 through 131 of relays OP, WOR, AOP and AWO, so that the relay NP is deenergized when any one of these relays is operated to initiate a posting or wipe-out operation. The relay NP has a release time somewhat longer than that required for the energization of a space relay, correspondence relays and the like involved in the posting and wipe-out operation, together with the time required for positioning the indicators in space under normal conditions. An auxiliary circuit for the relay NP through a front contact 85 of the completion relay CP is preferably provided, so that the relay NP is reenergized as soon as the completion relay CP picks up at the end of a proper posting or wipe-out operation.

If there should be some failure in a manual or automatic posting or wipe-out operation, due to a failure of an indicator, or any of the relays and circuits involved in such operation, the completion relay CP is not energized within the usual time, and the no-posting relay NP releases after a time, thereby giving an audible signal and extinguishing the indicating lamp NPK to show the source of the trouble.

If this failure is due to an attempt to wipe-out data for some flight number not posted, the operator restores the system to the normal operating condition by actuation of the clear-out button COB, taking such other action as may be appropriate to determine what particular flight data if any should be wiped-out, and perform such wipe-out operation manually.

If, however, the failure occurs in connection with the posting operation due to a faulty indicator in some posting space, inspection of the posting panel will readily show which indicator has failed to move or stop; and in this case, the operator may actuate the emergency key or switch such as 1K, 2K etc. belonging to the particular space involved from the position shown to its other dotted line position, thereby by-passing the vacant space selection circuit around the space including the defective indicator, and permit the new flight data to be posted in some other vacant space. Thus, the desired flight data or schedule may be posted in the posting panel while repair or replacement of the defective indicator is made. This condition of by-passing a space continues as long as the emergency key such as 1K, 2K, etc. is left in its actuated position. It may be added that the emergency key, such as 1K, 2K etc. for eliminating the vacant space selection for a corresponding space may be used by the operator at other times, if he should desire to keep some space or spaces empty for special data, or for other purposes.

The important aspect of these features of the invention is that all posting and wipe-out operations are definitely checked for the accurate and proper positioning of the indicators, rather than merely initiated and carried out on the assumption that the various parts and circuits will operate in the intended manner. This avoids the display of erroneous or incomplete flight data, which might not otherwise be detected and be used by the operator in controlling the airplanes and result in accident or confusion. Also, the failure to complete accurately and properly any intended posting or wipe-out operation is at once brought to the attention of the operator for investigation and correction, rather than disregarded and perhaps leave an incomplete and faulty display of flight data for him to use.

*Automatic time sequencing*

In performing certain duties with respect to controlling flights, the operator or controller often has to take into consideration the order or sequence in which flights are scheduled to arrive at a terminal or pass certain points, and is greatly helped in performing his duties if the data for some or all of the flights is displayed by suitable indicators in the chronological order or time sequence of the scheduled times for these flights. For example, in connection with approach control and landing operations, it is desirable to be able to quickly determine the order in which flights are scheduled to arrive; and there are other conditions under which it is desirable to have the data for several flights displayed in the time sequence of their estimated or scheduled times of arrival.

The estimated or scheduled arrival time for flights at a given point may not be determined and reported to a central office for display purposes in the order of such times, particularly where flights approach a terminal point over different airways at different speeds, and are reported from outlying fixes at varying distances from such terminal point. Consequently, any posting of flight data in a display panel in the order in which scheduled times are determined or reported from outlying fixes is not likely to give a display of such data in the true chronological order of time sequence of the scheduled times. Further, even if data were posted in a predetermined order as received, this same order cannot be maintained in a posting panel over a period of time as new data to be posted is continually received to replace old data wiped out, without some repeated transfer or shifting operation of the data between spaces which is objectionable on account of the constant shifting of the indicators and change in the position of the postings, making it difficult for the operator to utilize the display of the data to the best advantage, as well as the much greater chance for error in carrying out such an operation.

In view of these considerations, it is proposed in accordance with this invention to display in a posting panel the data for flights in any indiscriminate order that this data may be determined or reported, or as vacant spaces become available, maintaining each schedule after once being posted, in the same space until wiped out, and to provide a separate sequence panel in which all, or a desired number, or the schedules displayed in the main posting panel are automatically rearranged and reposted so as to be displayed in the true time sequence of their scheduled times.

This separate sequence panel comprises rows of indicators the same as for the posting panel, into which all, or preferably a suitable limited number of the schedules in the posting panel, are transferred or reposted in time sequence, either from the top down, or from the bottom up in the panel as desired, this operation being entirely automatic in response to the operation of a time sequencing means.

Briefly stated, each time this time sequencing means is set into operation, either automatically or manually as later discussed, all of the then existing schedules in the posting panel are scanned or surveyed, so to speak, with respect to their scheduled times, and the desired number of these schedules are set up one at a time in successive spaces in the sequence panel in the proper order of their scheduled times. In this way, when any flight schedule is wiped out or revised, or a new flight schedule is posted, the schedules in the sequence panel may be automatically rearranged as may be necessary to display the data for a desired number of flights in the proper order of their scheduled times.

The sequencing means comprises a time scanning or time sorter device which consists of four like units corresponding to the four denominations of time, which are in effect step-by-step devices operating from an initial blank position until stopped by the energization of a control bus at a position corresponding with the lowest digit or earliest time for each of denominations of time. When these time sorter units have been operated and stopped in positions corresponding with the lowest digit for each denomination of time combined together to represent the earliest time with respect to all of the existing schedules of time in the posting panel, this earliest time, together with the flight number, altitude, or other data in the corresponding posting space is transferred to the first posting space in the sequence panel. After the earliest time for all existing schedules in the posting panel has thus been determined and transferred to the sequence panel, the indicators of the posting panel for this particular earliest schedule are rendered ineffective to govern the time sorter, which then picks out the next earliest time schedule, which is in turn transferred to the next succeeding space in the sequence panel selected by a step-by-step space selector; and the same operation is continued until all of the schedules or sets of flight data in the posting panel have been transferred, or the sequence panel becomes full, as the case may be.

In the particular arrangement illustrated, the time sorter units of Fig. 2C, designated THS, UHS, TMS and UMS for convenience, are assumed to be constructed the same as the indicator units of Fig. 8, with operating magnets OM, position contacts, and with or without the indicator drum as desired. Each of these time sorter units has a time correspondence relay such as relays ITC, 2TC, 3TC and 4TC for governing its operation, and an associated clear-out relay such as relays ICO, 2CO, 3CO and 4CO.

The space selector or scanner is illustrated as comprising a conventional contactor having two contact arms 134 and 135 operated by a stepping mechanism STM (see Fig. 2A). In the simplified construction shown diagrammatically, the contact arms 134 and 135 are connected together to a ratchet wheel 136 which is arranged to be advanced by a spring pawl 137 connected to the core 138 of a stepping magnet 139 operated to its retracted position by a spring 140. When the stepping magnet 139 is energized by a circuit made up through the lower contact arm 135, the pawl 137 is raised into position to engage the next tooth on the ratchet wheel 136, and at the same time the core 138 operates contacts 142 to open the energizing circuit for the stepping magnet. The resultant deenergization of the stepping magnet allows spring 140 to pull down the pawl 137 to advance the contact arms 134 and 135 a half step, in a clockwise direction as shown, opening the circuit through the lower contact arm 135 then energizing the stepping magnet and setting up circuit connections for subsequently operating the stepping magnet another half step to advance it to its next active position.

The upper contact arm 134 of the space selector engages contacts in certain normal and active positions, four as shown, which are connected to space relays, such as relay ISSP, for the sequence panel in a predetermined order, either from the top down, or from the bottom up, as desired, so that as the space selector is advanced, these space relays, such as relay ISSP, for the successive spaces in the sequence panel are energized in turn to transfer into such spaces the particular data of flight number, scheduled time, altitude and the like selected by the time sorter from the various schedules in the posting panel.

The sequencing operation is initiated by energization of a sequencing relay SQ; and since it is considered that the sequencing operation may be desirable under some conditions and not under others, an organization of circuits has been illustrated to enable the operator to determine when the relay SQ shall be energized to initiate the sequencing operation, whether in response to a definite manual act, or automatically in response to any change in the posting panel by either the posting of a new schedule or a wipe-out operation, or in response to a wipe-out operation in the posting panel only.

Referring to Fig. 2A, the energization of the sequencing relay SQ is controlled by relays OP, WOR, AOP and AWO operated in connection with manual and automatic posting and wipe-out operations, together with a slightly slow-release relay SA, selector switches 1SL and 2SL of the conventional telephone type key switches or the equivalent, and a self-restoring push button SQB.

Assuming the selector switches 1SL and 2SL to be in the closed positions shown, when the relay OP is energized for a manual posting operation, the relay SA is energized over a circuit from (+), through front contact 144 of relay OP, selector switch 2SL in a closed position, relay SA, selector switch 1SL in a closed position, sag contact 145, wire 455, sag contact 146 (these sag contactors are associated with the automatic posting and wipe-out equipment later explained), to (—). At the end of the posting operation, the release of relay OP establishes a momentary pick-up circuit for the relay SQ from (+), through back contact 144 of relay OP, back contacts 147, 148 and 149 of relays WOR, AOP and AWO, front contact 150 of relay SA, relay SQ, to (—). The relay SQ is energized over its pick-up circuit only during the release time of the relay SA, so that a stick circuit through its front contact 152 and contacts 153 of the space selector is provided to maintain the relay SQ energized until the stick circuit is opened by the space selector in its last half-step position at the end of a sequencing operation.

With the selector switches 1SL and 2SL closed as shown, the sequencing relay SQ is also energized in a similar manner in response to the operation of the relay WOR for a manual wipe-out operation, or relay AOP for an automatic posting operation, or relay AWO for an automatic wipe-out operation.

If the selector switch 2SL is opened, however, then the relay SA is not energized to prepare a circuit for energization of the sequencing relay SQ by the operation of relays OP and AOP for posting operations, so that sequencing operations occur only in response to operation of relays for WOR and AWO for wipe-out operations.

If the selector switch 1SL is opened to break the energizing circuit for relay SA, then the relay SQ is not energized automatically in response to either a posting or wipe-out operation.

When no posting or wipe-out operation is in progress so that the back contacts 144, 147, 148 and 149 of relays OP, WOR, AOP and AWO are closed, the sequencing relay SQ may be energized by manual actuation of the push button SQB at any time.

Thus, the operator may determine when the sequencing operation shall occur, as he may desire. He may open the selector switch 1SL and suppress further sequencing operation, if he desires to keep the postings in the sequence panel undisturbed for study or other purposes. If a substantial number of flight schedules have been accumulated in the posting panel, so that no subsequent posting operation will likely affect the sequenced data in the sequence panel, the operator may open the selector switch 2SL and prevent any further sequencing operation until some wipe-out occurs. Finally, the operator may manually initiate the sequencing operation for checking purposes or otherwise by actuation of the push button SQB at any time when there will be no interference with posting or wipe-out operations then in progress.

Figure 6C:
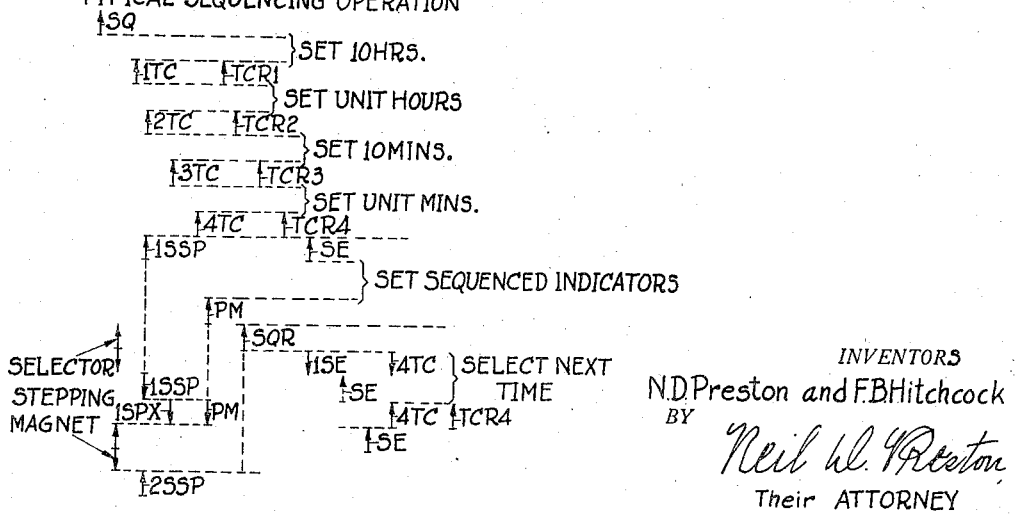

*Typical time scanning operation.*—As a typical example of the time sequencing operation, assume that only two schedules appear in the posting panel with the scheduled times such as 23:50 and 23:15 as indicated at the top of the panel in Fig. 1. These schedules may appear in any space; but to facilitate the explanation, it will be assumed that these schedules appear in the first and second posting spaces in the order illustrated in Fig. 1. The general sequence of relay operation is shown in Fig. 6C.

When the sequence relay SQ in Fig. 2A is energized, either automatically or manually as just explained, it closes a front contact 156 to connect (+) over wire 157 to a time feed bus TFB, which is connected through a back contact of a sequence control relay for each of the spaces, such as the back contact 158 of the relay 1SQC shown in Fig. 2C, wire 159, back contact 80 of the associated flight verification relay, such as 1FV, to the correspondence relay, such as relay 1TCR1 for the tens of hours or highest denomination of time. Since there is a similar connection for each space of the posting panel, (+) is connected to one or more of the control buses for this denomination of time dependent upon the position of the indicators in the various spaces. In the case assumed, the tens of hours indicators in the upper two posting spaces are both in position 2, and (+) is thus connected to control bus 2 only.

The energization of the relay SQ at the same time closes a front contact 161 to connect the intermittently energized master pulsing bus P over wire 160, front contact 161, wire 162 to Fig. 2C, through a back contact 163 of the correspondence relay 1TC for the first time sorter unit THS, through the operating magnet OM of this unit, to (—), thereby initiating step-by-step operation of the contact arm of this tens of hours time sorter unit from any position in which it may happen to be in a clockwise direction. At this time, i. e. at the beginning of a sequencing operation the clear-out relays 1CO, 2CO, etc. are all deenergized, and hence the circuit connection from (—) to the contact element of the position contacts for the first time sorter unit under consideration is open at the front contact 164 of relay 1CO. When the contact arm for this first time sorter unit has been advanced from its existing position around to the initial or blank position, its empty-full contact 165 is operated from the position shown to the dotted position to close a pick-up circuit for relay 1CO from (+), through front contact 166 of relay SQ (Fig. 2A), wire 167 to Fig. 2C, empty-full contact 165 in its dotted position, relay 1CO, to (—). The energization of relay 1CO and closure of its front contact 168 establishes a stick or locking circuit for this relay to maintain it energized independently of continued movement of the time sorter unit and opening of the empty-full contact 165.

The tens of hours time sorter unit THS having thus been started off from its initial position, the energization of the associated clear-out relay 1CO and closure of its front contact 164 at the same time connects (—) to the position contacts of this time sorter unit, so that as this unit is stepped around it acts to connect (—) to each of the associated tens of hours group of control buses one at a time in succession, starting with the lowest numbered (zero) bus. As soon as the position contact of the time sorter unit THS during this scanning operation of the time buses in question reaches a bus which is connected to (—) through a correspondence relay, such as relay 1TCR1, of one or more of the posting spaces, each such correspondence relay is energized by a circuit which in the case of the relay 1TCR1, with its indicator in the assumed position 2, may be traced from (+), through front contact 156 of relay SQ in Fig. 2A, wire 157 to Fig. 2C, time feed bus TFB, back contact 158 of sequence control relay 1SQC, wire 159, back contact 80 of relay 1FV, correspondence relay 1TCR1, indicator in position 2, time bus 2, time sorter unit THS in position 2, through front contact 164 of relay 1CO, to (—).

If, as in the case of the times of 23:15 and 23:50 assumed, there is a schedule of time in more than one space starting with the number 2, the correspondence relay, such as relay 1TCR1, for each such space is likewise energized by a similar circuit.

The energization of the correspondence relay or relays such as 1TCR1 closes a front contact 170 to supply (+) to a bus 171 for energizing the relay 1TC for the time sorter unit under consideration, thereby opening its back contact 163 to break the connection from the pulsing bus P to the associated operating magnet OM and stop this time sorter unit THS in the selected position 2. At the same time, the closure of the front contact 163 of relay 1TC extends the connection from the pulsing bus P through back contact 183 of relay 2TC to the operating magnet OM for the next time sorter unit UHS for unit hours.

The energization of the correspondence relay 1TCR1 in addition to stopping the tens of hours time sorter unit THS, extends the supply of energy from the time feed bus TFB through the front contact 173 of relay 1TCR1 and back contact 81 of relay 1FV to the correspondence relay 1TCR2 for the next or unit hours denomination of time for this particular space. If there are several posting spaces which have the same number in the tens of hours of denominations in their schedules, then energy is passed on to the correspondence relay for the unit hours denomination of time for each of such posting spaces, thereby energizing one or more of the buses in the unit hours group in accordance with the positions of the unit hours indicators in such spaces.

The same operation of starting the unit hours time sorter unit UHS from its initial position and scanning the unit hours buses is carried out to determine the lowest unit hours digit of the schedules so far selected. The time sorter unit UHS is stepped around from any position it may happen to occupy until its empty-full contact 174 shifts to permit energization of the clear-out relay 2CO over a circuit connection including the front contact 175 of relay 1TC; and the energization of relay 2CO closes its front contact 176 to provide its own stick circuit and a front contact 177 to connect (—) to the position contacts of this time sorter unit.

In the case of the scheduled times of 23:15 and 23:50 assumed to be in the first and second posting spaces, the unit hours correspondence relay, such as relay 1TCR2, for each of the spaces including these times is energized when the time sorter unit has been advanced to the position 3; and these correspondence relays, such as relay 1TCR2, close front contacts, such as front contact 180, to energize a bus 181 to pick up the relay 2TC and open its back contact 183 to stop the time sorter unit in this position. The energization of the correspondence relay 1TCR2 for the first space also closes a front contact 182 to extend the supply of energy from the time feed bus through a back contact 82 of relay 1FV to the correspondence relay 1TCR3 for the next lower or tens of minutes denomination of time. A similar circuit is closed for the correspondence relay 2TCR3 (not shown) for the second posting space, since its relay 2TCR2 (not shown) has been picked up.

This energization of the relay 2TC and closure of its front contact 183 extends the connection from the pulsing bus P through back contact 192 to the operating magnet OM of the next time sorter unit TMS; and the closure of the front contact 184 of relay 2TC provides a circuit connection for picking up and sticking up the clear-out relay 3CO for this next time sorter unit.

This next time sorter unit TMS operates in the same manner described from its existing position to shift its empty-full contact 187 to permit energization of relay 3CO and establish a stick circuit for it through its front contact 188, as well as closing a front contact 189 to connect (—) to the position contacts of this time sorter unit.

In the case of the times of 23:15 and 23:50 assumed, it can be seen that the bus 1 of the tens of minutes group is energized in accordance with the position of the time indicator in one space, while the bus 5 of the same tens of minutes group is energized by the time indicator in the other space. As the position contacts of the associated tens of minutes time sorter unit TMS are stepped around from the initial position, (—) is connected to the bus 1 before the bus 5 is reached; and consequently, the correspondence relay, such as relay 1TCR3 for the first posting space including the time of 23:15, is energized to close a front contact 190 and energize bus 191 to pick up relay 3TC and open its back contact 192 to stop the time sorter unit TMS in this position, while the correspondence relay such as relay 2TCR3 (not shown) for the second posting space remain de-energized.

The energization of the correspondence relay such as relay 1TCR3 for the particular space now selected closes a front contact 195 to extend the supply of energy from the time feed bus TFB through a back contact 83 of relay 1FV to the correspondence relay 1TCR4 for the unit minutes denomination of time for this particular space only. Consequently, in the particular example assumed, only the bus 5 of the unit minutes group is energized in accordance with the position of the indicator in the space including the time of 23:15.

The energization of the relay 3TC for the tens of minutes time sorter unit TMS, in addition to stopping this unit, closes a front contact 192 to extend the pulsing bus P through back contact 202 to the operating magnet OM for the next time sorter unit UMS and also a front contact 196 for extending the circuit connection for picking up and sticking up the clear-out relay 4CO for this next time sorter unit when its empty-full contact 197 closes. The energization of relay 4CO provides a stick circuit through its own front contact 198 and also closes front contact 199 to connect (—) to the position contacts of this unit minutes time sorter unit UMS.

The unit minutes time sorter unit UMS now steps around from its blank position to position 5, where the correspondence relay 1TCR4 is energized to close a front contact 200 and energize a bus 201 to energize relay 4TC and open its back contact 202 to stop this time sorter unit UMS.

The time sorter units are now in positions corresponding with the earlier time of 23:15, the relays 1TC, 2TC, 3TC and 4TC associated with these units are all energized, and all of the time correspondence relays such as 1TCR1 to 1TCR4 for the particular posting space containing this time are energized. The selecting or scanning operation for determination of the earliest posted time has been completed, and the next step in the operation involves the transfer or posting of the data for this flight schedule into the first space of the sequence panel.

*Transfer of selected flight schedule to the sequence panel.*—After the space having the earliest time posted therein has been identified in the manner just described, it is necessary to render the flight number and altitude indicators for this particular space effective to govern the energization of the control buses so that the entire flight schedule of this selected posting space may be transferred to the sequence panel.

The energization of the unit minutes correspondence relay, such as relay 1TCR4, for the selected space closes a front contact 204 to complete an energizing circuit for a selection relay, such as relay 1SE belonging to that space, this energizing circuit as a whole being traced from (+), through front contact 156 of relay SQ in Fig. 2A, wire 157, time feed bus TFB back contact 158 of the associated sequence control relay such as 1SQC, wire 159, back contact 80 of relay 1FV, front contact 173 of relay 1TCR1, back contact 81 of relay 1FV, front contact 182 of relay 1TCR2, back contact 82 of relay 1FV, front contact 195 of relay 1TCR3, back contact 83 of relay 1FV, front contact 204 of relay 1TCR4, selection relay 1SE, through a back contact 205 of a similar relay 2SE for the next space below, then through a back contact 206 of a similar relay 3SE for the second space below, and so on through similar back contacts of the selecting relays SE for all of the remaining spaces of the posting panel, to (—).

The energization of the selection relay, such as relay 1SE, for the space selected as having the earliest time closes front contacts 208, 209 and 210 to connect (+) to the position contacts for the first and second digits of the flight number indicators, and the altitude indicator. In other words, the energization of the selection relay 1SE for the particular space selected renders the flight number and altitude indicators of that particular space effective to control the energization of the flight number and altitude control buses for re-posting this data into the sequence panel.

At the same time the selection relay, such as relay 1SE, is energized, the energization of the correspondence relay 4TC for the unit minutes time sorter unit closes a front contact 212 to supply (+) from front contact 166 of relay SQ, wire 167 through the front contacts 175, 184, 196 and 212 in series of the relays 1TC, 2TC, 3TC and 4TC to a wire 213 extending to the upper contact arm 134 of the space selector in Fig. 2A, and with this arm 134 in the first position as shown this circuit extends over wire 214 to pick up the space relay 1SSP in Fig. 2B for the first space in the sequence panel.

The energization of relay 1SSP closes a front contact 215 to connect (—) to a bus 216 connecting correspondence relays 1SCR, 2SCR, 3SCR etc. through rectifiers 217 to the position contacts of the indicators in this space of the sequence panel, so that if these indicators should happen to be in the position corresponding to the then existing energized condition of the associated control buses, the correspondence relays 1SCR, 2SCR, etc. may be at once energized to open their back contacts such as 218 of relay 1SCR and disconnect their operating magnets OM from the operating bus 219 for that space. Upon energization of a space repeater relay 1SPX by an obvious circuit through front contact 220 of space relay 1SSP, the master pulsing bus P is connected over wire 221, through the back contact 222 of relay PM, wire 223, a pulsing bus 224 for the sequence panel, front contact 225 of space relay 1SSP, a front contact 226 of a repeater relay 1SPX, to the operating bus 219 for the space.

In other words, the space repeater relay 1SPX acts to delay the connection of pulsing energy to the operating magnets OM of the indicators for the associated space of the sequence panel until there is time for the correspondence relays 1SCR, 2SCR, etc. for such indicators to be energized, if their positions should happen to match those called for by the existing energization of the control buses, which sometimes happens as the various schedules are sorted over and put into the sequence panel, as can be appreciated after some consideration of the varying conditions that may exist. For example, if the data for a limited number of flights in the sequence panel have been posted in the proper time sequence, and then some flight schedule with a still later time is to be added to the sequence panel, it can be seen that no change is required in the indicators for the schedules already posted in the sequence panel; and the expedient just described for giving the correspondence relays ISCR, 2SCR, etc. time preference to disconnect pulsing energy from the associated operating magnet OM obviates the possibility of unnecessary idle operation of these indicators.

The time to be posted in the first space of the sequence panel in the example under consideration is determined by the energization of control buses governed by additional position contact arms 230, 231, 232 and 233 on the time sorter units, these arms being connected to (+) through a wire 234 and a back contact 235 of a relay SQE. Thus, it is the time as a whole represented by the existing positions of the time sorter units which is posted in the sequence panel, rather than shift the indicators in the sequence panel from an existing position to some position corresponding with some time bus for the different denominations of time of the posting panel that may then be energized. This avoids the possibility of an erroneous setting of the time indicators in the sequence panel when changed from some existing position to some other time. For example, in the case of the times of 23:15 and 23:50 assumed, the bus 5 for the tens of minutes group is energized as well as bus 1; and if the indicator in the sequence panel should happen to be in position 2, 3, 4 or 5 on account of some previous time setting for this space, and if this indicator were directly controlled from the time buses, it can be seen that this indicator would stop in position 5 and would not assume the proper position 1 for the earlier time 23:15.

When the various indicators for flight number, time and altitude in the first space of the sequence panel under consideration have all been properly positioned in accordance with the flight data of the particular posting space then selected, the closure of front contacts 237, 238, 239, 240, 241, 242 and 243 in series of the correspondence relays ISCR, 2SCR, etc. connects (+) to a bus 244 to energize a relay PM indicating that the sequenced posting has been made; and this relay PM is held up by a stick circuit through its front contact 245, wire 246, sequence panel bus 247, and a front contact 248 of the space relay ISSP now energized.

The energization of the relay PM opens its back contact 222 to disconnect the master pulsing bus P from the sequence panel pulsing bus 224, and also closes a front contact 249 to energize a wire 250 connected to the suppression bus SUP in Fig. 2C for the posting panel. At the particular space selected as having the earliest time posted therein, the selection relay, such as relay ISE, is energized to close its front contact 251; and the energization of the suppression bus SUP supplies energy through this contact 251 to energize the pick-up circuit of the sequence control relay, such as relay ISQC, for this particular space, opening its back contact 158 to disconnect the time feed bus TFB from the indicators of this space, and thus render the positions of their time indicators thereafter ineffective to control the energization of the time buses. In short, this particular posting space, having been selected and its schedule time transferred to the sequence panel, is dropped out, so to speak, from the series of times to be sorted over. The relay, such as relay ISQC, is held up until the end of the sequence operation by a stick circuit through its front contact 158 and the time feed bus TFB energized through front contact 156 of relay SQ.

The energization of the relay PM in Fig. 2A at the completion of the posting in the sequence panel also establishes a circuit for the stepping magnet 139 of the space selector from (+), through front contact 253 of relay SQ, front contact 254 of relay PM, lower contact arm 135 of the space selector in the first position shown, wire 255, through the stepping magnet 139 and its contacts 142, to (—), thereby advancing the contact arms 134 and 135 of the space selector from the position 1 shown to the next half-step position. This movement of the upper contact arm 134 deenergizes the space relay ISSP, which opens at its front contact 225 the connection from the pulsing bus P to the operating magnets OM of the associated indicators. The deenergization of the space relay ISSP opens at its front contact 248 the stick circuit for the relay PM, its pick-up circuit having been broken in the meantime by energization of a relay such as relay ISQC and release of the correspondence relays ISCR and 2SCR for flight number. The release of the relay PM establishes a circuit through its back contact 254 and the lower contact arm 135 of the space selector in its half-step position to operate the stepping magnet 139 again and advance the selector to its next active position corresponding to the second posting space of the sequence panel.

While the space selector is being operated by the energization and deenergization of the relay PM, the energization of the sequence control relay such as ISQC for the selected space to render the indicators in this space ineffective to control the time buses also acts to initiate an operation of the time sorter unit to pick out the next earliest time. In the case of the two times 23:15 and 23:50 assumed, when the earliest time of 23:15 is dropped out, the indicators in the other space maintain buses 2 and 3 energized for the tens of hours and unit hours denomination of time, so that correpondence relays ITC and 2TC of the time sorter unit remain energized. The correspondence relay 3TC for the tens of minutes unit TMS, however, is deenergized, because the remaining posting calls for an energization of bus 5 and this unit is in position 1. This deenergization of relay 3TC connects through its back contact 192 the source of pulsing energy to the operating unit OM of this unit TMS to advance the indicator to this position 5. Also, the opening of front contact 196 of this relay 3TC releases the relay 4CO for the next time sorter unit UMS for unit minutes, so that the contact arm for this time sorter unit UMS must move to its blank position to reenergize relay 4CO and close front contact 199 to allow the correspondence relay 4TC to pick up when the contact arm for the unit reaches the first energized bus. In the example assumed, the contact arm of this unit minutes time shorter is thus advanced from its prior position 5 past the initial blank position to position 0 called for in the next time of 23:50.

When the time sorter units have been positioned and the correspondence relays ITC, 2TC, 3TC and 4TC are energized to close their front contacts 175, 184, 196, 212 and the space selector arm 134 reaches its next active position, the space relay, such as relay ISSP, for the next space in the sequence panel is energized to post this next selected flight schedule in the next lower space in the same manner previously described.

The same operation of setting the time sorter units, energization of a particular selector relay such as 1SE, posting the selected flight data in the next space of the sequence panel, and then advancing the space selector, continues until either the sequence panel has been filled, or all of the schedules in the posting panel have been sequenced, as the case may be. If there are more schedules in the posting panel than number of spaces in the sequence panel, when the space selector is operated to the last half-step position, the contacts 153 in the stick circuit of relay SQ open and release this relay to terminate the sequencing operation. The space selector is advanced to the initial position by a circuit from (+), through back contact 156 of relay SQ, contacts 257 opened only with the space selector in the initial position, contact arm 135 in the last half-step position, wire 255, and the stepping magnet 139 through its contacts 142, to (—).

If there should be a smaller number of postings in the posting panel to be sequenced than the number of spaces provided in the sequence panel, as in the case of only two postings in the example previously assumed, then the space selector is operated automatically to pick up the space relay such as 1SSP for each of the remaining spaces and cause operation of their indicators to the blank position, if not already in such position. Such blanking of the indicators in the spaces of the sequence panel not changed to conform with a sequenced schedule will occur, for example, when the number of postings in the posting panel becomes less than the capacity of the sequence panel by some wipe-out operation. For example, if one schedule of the original four appearing in the posting panel and in the sequence panel is wiped-out, the three remaining schedules are transferred or re-arranged to be displayed in the sequence panel in the first three spaces in the sequence panel, and the indicators for the remaining spaces should be automatically blanked out.

Considering this particular operation more in detail, and assuming the sequence control relay, such as relay 1SQC, is energized for the last schedule in the posting panel to be sequenced, and all other posting spaces in the posting panel are vacant, a relay SQE, signifying that the sequencing operation is ended for all existing schedules, is energized by a chain-stitch type of circuit, which includes in series a pair of contacts in multiple associated with each of the posting spaces in the posting panel, one of these contacts being an empty-full contact 260 associated with one of the indicators, and the other a front contact 261 of the associated sequence control relay 1SQC. In other words, if a space is empty so that its empty-full contact such as 260 is closed, or its posting has been transferred to the sequence panel so that its sequence control relay, such as relay 1SQC, is energized to close its front contact 261, then the chain stitch circuit for relay SQE is completed as far as that space is concerned; and if this is true for all spaces, then the relay SQE is energized over a circuit including wire 262, as can be readily understood without tracing the circuit connections in detail.

The energization of the relay SQE to mark the end of the sequence operation opens its back contact 235 to disconnect (+) from the contact arms of the time sorter units, and closes its front contact 235 to connect (+) to wire 213 and the upper arm 134 of the space selector, thereby energizing the space relay, such as relay 1SSP, for the next space in the sequence panel. The energization of the relay SQE also closes a front contact 264 to connect (+) to a blanking bus 265 for the panel extended to the initial or blank contacts of all of the indicators in the space in question through a front contact of its space relay, such as front contact 266 of relay 1SSP. Since the flight number, time and altitude buses for the sequence panel are deenergized, all of the indicators in this next space of the sequence panel are operated to the blank positions, if not already there.

When this blanking operation is completed, the relay PM is energized to advance the space selector the next half-step position, thereby moving the contact arm 134 to deenergize the space relay, such as relay 1SSP, then energized and release relay PM to cause the space selector to advance to the next active position. The same operation is continued for any remaining space or spaces of the sequence panel, until the contacts 153 are opened in the last half-step position of the space selector to release the sequence relay SQ.

The deenergization of the sequence relay SQ at the end of a sequencing operation restores the relays 1CO, 2CO, 3CO and 4CO to their normal deenergized condition shown by opening front contact 166 of relay SQ. The opening of front contact 161 of relay SQ disconnects the master pulsing bus P from the operating magnets for the time sorter units; and the opening of the front contact 156 of relay SQ releases the sequence control relays such as 1SQC, and in turn relay SQE if it should be happening to be energized, thereby restoring the parts and circuits of the sequencing means to the normal condition shown, ready for some subsequent operation.

Since the sequencing operation involves the control buses for the posting panel, there should be no manual or automatic posting or wipe-out operation while the relay SQ is energized for the sequencing operation; and the opening of the back contact 52 of relay SQ while the sequencing operation is in progress prevents the energization of the relays OP and WOR by actuation of their push buttons PB and WOB, and also prevents initiation of automatic posting or wipe-out operations by circuit connections more conveniently described later.

The sequence relay SQ is preferably provided with suitable means such as the indicating lamp SQK controlled through a front contact 267 of this relay SQ to indicate to the operator when a sequencing operation is in progress.

*Characteristic features of the time sequencing operation.*—Considering the significance of some of the features of the time sequencing operation represented by the typical example just described, it will be noted that the positioning of the time sorter units when the sequencing relay SQ is first energized is carried out in succession for each denomination of time in turn, starting with the highest or tens of hours denomination, and that during such positioning operation each time sorter unit is operated past its initial or blank position to the position corresponding with the lowest numbered bus of the associated group of time buses then energized. In other words, each time sorter unit in effect starts out from an initial position and scans the associated group of time buses in numerical order to select and stop at the bus for the lowest digit then being energized as a result of the schedules in the posting panel. This sequential scanning of the time buses serves to pick out the bus then energized corresponding to the lowest digit.

After a little consideration it will be evident, however, that one time as a whole may be earlier than some other time and yet not have smaller digits for each of its denominations. For example, the time of 10:55 is earlier than 11:00, but this earlier time has a smaller digit only for the unit hours denomination. Similarly, with respect to the individual denominations of a complete time, an earlier time may have either smaller or larger digits in one or more of its denominations than some other later time, as in the case of the times 10:45 and 11:50; 10:15 and 10:28, and so on for a number of different combinations. In order to select the earliest time, therefore, it is necessary to do more than merely pick out the lowest digit for each denomination of time from buses energized in accordance with all of the different denominations of time for all of the existing postings. For these reasons, the time sorting operation is carried out for the different denominations of time in turn starting with the highest, and the indicators in each posting space are rendered effective to govern the energization of the associated group of time buses only if the digits for each of the higher denominations of time as represented by the indicators in this same space are as small, or as early in time, as any one of the remaining unsequenced postings.

Thus, referring to Fig. 2C an indicator for unit hours for the posting space illustrated is effective to control the energization of the unit hours buses, only if the correspondence relay ITCR1 for tens of hours is energized to close its front contact 173. Similarly, the indicator in this space for the tens of minutes is effective to control the energization of the associated group of time buses only if the correspondence relay ITCR2 for unit hours is energized to close its front contact 182 as well as the correspondence relay ITCR1 for tens of hours to close its front contact 173; and in the same way the indicator for unit minutes is effective to control the energization of the associated group of buses only if the correspondence relays ITCR1, ITCR2 and ITCR3 for the same space are energized to close their front contacts 173, 182 and 195.

Disregarding the situation where posted times relate to different days, such as 23:50 and 01:45, later considered, the tens of hours indicator for each posting space in the posting panel is effective to govern the energization of the associated group of time buses; and the first time sorter unit, after starting from the initial position, stops in a position corresponding with the lowest number bus then energized, taking all times starting at zero in preference to those starting with 1, then all times starting with 1 in preference to those starting with 2. When this time sorter unit stops, the correspondence relay for the tens of hours, such as relay ITCR1, is energized for each of the posting spaces having a corresponding first time digit, and renders the position of the associated unit hours indicators effective to control the unit hour control buses and determine the position of the next time sorter unit, whereupon correspondence relay such as ITCR2 for unit hours is energized in all of the spaces having the same time for both digits of hours posted therein. The tens of minutes indicator for these particular spaces is then rendered effective to control the position of the next time sorter, and so on until the particular schedule, in which the time as a whole is the earliest, is the one which has determined the position of the time sorter units, and is the one which has been selected for re-posting in the sequence panel by the energization of its selector relay such as ISE. Some one or more of the corresponding relays, such as ITCR1, ITCR2, etc. may be energized for one or more of the other spaces, but the only space having all of its time correspondence relays energized is the one which has the earliest time posted therein.

When such earliest time schedule has been transferred to the sequence panel, and the postion of its indicators rendered ineffective to govern the energization of the time buses by reason of the energization of the associated sequence control relay, such as relay ISQC, then the time sorter units are free to operate to positions for the next time. This new positioning of the time sorter units also involves special operations in the way of the clear-out relays ICO, 2CO, 3CO, and 4CO to assure proper time selection. As previously noted, at the beginning of each sequencing operation all of the clear-out relays ICO, 2CO, 3CO and 4CO are deenergized, and each time sorter unit has to move past its initial or blank position before its associated correspondence relay ITC, 2TC, 3TC and 4TC may be energized to stop its movement. The clear-out relay ICO for the highest denomination of time, when initially energized by movement of its associated time sorter unit to the initial position, is maintained energized by its stick circuit through its front contact 168 until the sequence relay SQ releases at the end of the sequencing operation, because the time sorter unit for this highest denomination of time is merely required to advance from one position to the next during the time sorting operation, such as from the zero position to position 1 for times such as 09:50 and 10:05, or from position 1 to position 2 for times such as 19:50 and 20:05, or from position 2 around to the zero position for times such as 23:50 and 00:05.

The clear-out relays 2CO, 3CO and 4CO for the other lower denomination of time, however, are deenergized from time to time as required during the sequencing operation so as to perform the desired function of registering the earliest time. Referring to Fig. 2C it will be noted that the stick circuit for clear-out relay 2CO includes a front contact 175 of the correspondence relay ITC, and that the stick circuit for the clear-out relay 3CO includes front contacts 175, 184 of the correspondence relays ITC and 2TC, while the energizing circuit for the last clear-out relay 4CO includes front contacts 175, 184 and 196 of all three of the correspondence relays ITC, 2TC and 3TC. In other words, each clear-out relay 2CO, 3CO and 4CO for the lower denominations of time is automatically released whenever a change occurs in the position of the time sorter unit for any higher denomination of time. As previously explained, when any one of these clear-out relays 2CO, 3CO or 4CO is deenergized, its associated time sorter unit must step around past the initial position before its clear-out relay may be again energized to connect (—) to the position contacts and permit energization of the associated correspondence relay 2TC, 3TC or 4TC to stop that time sorter unit.

This control of the time sorter units is required to assure that the scanning of the time buses for the various denominations will result in the selection of the true earliest time. This is best explained by referring to specific examples of times. Assuming a time of 10:15 has been selected and posted out of a group of schedules including times of 10:20 and 10:28, the change of the tens of minutes time sorter unit from position 1 corresponding to the time of 10:15 to the position 2 for the times of 10:20 and 10:28 is accompanied by a momentary deenergization of the corresponding relay 3TC and release of the clear-out relay 4CO, so that the unit minutes time sorter unit starts from its initial position in scanning the unit minutes buses and thus stops at the zero position for the earlier time of 10:20, rather than merely moving from position 5 for which it was set for the time of 10:15 to the position 8 for the time 10:28. Similarly, there may be a change in unit hours which requires both the tens of minutes and unit minutes time sorter units to start from their initial position to select the proper time, as for example, in the case of times such as 10:30, 11:45 and 11:28, or even in the tens of hours digit, as for example, in the case of times such as 19:30, 20:42 and 20:15. Consideration of other possible combinations of different times will make it clear, it is believed, why it is necessary to start the scanning of the time buses for the lower denominations of time from the initial starting points, whenever there is a change in the digit for some higher denomination of time.

With this explanation of the general operating features of the system, together with the description of one typical example of such operation, it is believed that it can be understood and appreciated how the organization of this invention serves to select or identify and repost flight data automatically in the sequence panel in the strict chronological order or time sequence of the scheduled times for any desired number of schedules in the posting panel, irrespective of their arrangement or order in that panel.

*Times for different days.*—It may well happen that during the closing hours of a day the posting panel will include schedules belonging to different days, such as the times of 23:15 and 23:50 for one day and times of 01:06 and 01:45 for the next day as shown in Fig. 1.

Under these conditions, although the times for the next day, such as 01:45 are lower in digital value than the times such as 23:15 for the previous day, these times with the smaller digits are actually later times from the standpoint of proper time sequencing; and accordingly, it is necessary to make special provision in the time sequencing operation to assure posting of the times with the larger digits prior to those with the smaller digits. This function is performed by another day relay AD in Fig. 2C which is connected from the bus 2 of the tens of hours digit over wire 269 and a front contact 270 of the sequence relay SQ, to (—), so that this relay AD is energized if the bus 2 is connected to (+) by any time schedule, such as 23:15, appearing in any space of the posting panel. The energization of the relay AD opens at its back contact 271 the connection between the bus 0 of the tens of hours and the zero position contact of the associated time sorter unit THS. This relay AD is relatively high resistance, so that the current which flows through it is not sufficient to pick-up the correspondence relay for any posting space, such as relay 1TCR1 for example, although its contact 271 quickly responds to such energization. This is of course a matter of selecting the proper resistance values compared to the sensitivity of the relays involved.

Considering the function performed by the another day relay AD, and assuming that the posting panel includes times for different days such as indicated in Fig. 1, the relay AD is initially energized as soon as the front contact 156 of relay SQ closes to supply energy to the time feed bus TFB and before the tens of hours time sorter unit THS can operate past its initial position to the zero position, and is maintained energized until all of the schedules for the first day having a first digit of 2 have been time sequenced and transferred to the sequence panel. When the relay AD is energized, the energization of the zero bus for the times belonging to the next day such as the time 01:45, is not effective to govern the position of the time sorter unit. Thus, the time sorter unit THS operates to position 2 where the connection of (—) through front contact 164 of relay 1CO causes the correspondence relays for the spaces having the number 2 in the tens of hours denomination of time to be energized. This, of course, causes the energization of the relay 1TC over bus 171 as previously described and stops the operation of the time sorter unit THS in this position 2. It will be noted that the time sorter unit THS in position 2 with front contact 164 closed, short circuits the relay AD and causes its release. However, this is not material since the time sorter unit THS remains in such position 2 until all of the posting spaces having a 2 in the tens of hours denomination of time have been sequenced and transferred to the sequence panel. This condition is, of course, registered for each of these spaces by the picking up of their respective sequence control relays, such as relay 1SQC. Thus, when all of the schedules for the first day having 2 for the tens of hours denomination of time have been sequenced and transferred to the sequence panel, their correspondence relays, such as relays 1TCR1, 1TCR2 etc., are de-energized by reason of the opening of their circuits through back contacts of their respective sequence control relays, such as relay 1SQC opening back contact 158. This deenergizes the relay 1TC and causes the operation of the time sorter unit THS to find the next energized bus which in this case, assuming schedules for the next day, will be the position zero, since back contact 271 of the another day relay AD is now closed. In other words, all of the times for the preceding day having been sequenced, the relay AD is released to close its back contact 271 and allow the tens of hours the sorter unit THS to assume the zero position to conform with the times for the next day, such as 01:45.

In this connection, it is of course assumed that the times appearing in the posting panel will cover a limited range or span of time dependent upon the density of traffic and frequency of the planes which will be rarely if ever more than an hour or two, so that the schedules for different days to be differentiated will be those having only the digits of 2 and 0 in the tens of hours digit.

*Posting schedules having the same time.*—It may happen that flights may be assigned exactly the same estimated or scheduled arrival time at a terminal or other point, particularly if these flights are allocated different altitudes, or are approaching from different directions over different airways.

In order that such postings having the same time may be properly transferred to the sequence panel, the energizing circuits for the selector relays such as 1SE for the different spaces are interlocked, as indicated in Fig. 2C and shown more fully in Fig. 7, to permit only one relay SE to be energized at a time, in a predetermined sequence, if the times posted in different spaces should be the same and tend to energize their associated relays SE at the same time.

Referring to Figs. 2C and 7, the energizing circuit for the selection of relay 1SE for the first top space from the time feed bus TFB through back contact 158 of relay 1SQC, wire 159 and the various contacts 80, 173, 81, 182, 82, 195 and 83 of the time correspondence relays and relay 1FV, including the front contact 204 of the unit minutes correspondence relay 1TCR4, after passing through the windings of the relay 1SE (see Fig. 7), continues through the back contact 205 of relay 2SE for the next space below thence through the back contact 206 of the relay 3SE for the second space below, and so on through other back contacts, indicated by crosses, of the relays SE for the remaining spaces, to (—).

By reason of this interlocking circuit, if the same time should appear in the first two spaces, for example, the energization of the relay 2SE and opening of its back contact 205 prevents energization of the relay 1SE, with the result that the posted flight number and altitude in the second space having its relay 2SE energized is the one transferred first to the sequence panel. When this has been done, and the sequence control relay 2SQC for this space is energized to break at its back contact 158a the energizing circuit for relay 2SE (typically described for posting space one Figs. 2B and 2C), then the relay 1SE for the other space may be energized to transfer its schedule data of flight number and altitude to the next space in the sequence panel. In this case, since the times are the same, there is no change in the time sorter unit, and the same time appears for both of the transferred scheduled in the sequence panel.

In this way, different flight schedules with the same scheduled time are displayed separately in different posting spaces in the sequence panel. Since the times are the same, the order in which these schedules appear is not significant, and hence the schedules may be transferred in the order they appear in the posting panel, either from the bottom up for the arrangement of interlocking circuits for the relays SE shown, or by an obvious change from the top down.

*Automatic posting and wipe-out*

While posting and wipe-out of flight data in the posting panel may all be done by manual positioning of setting dials or some equivalent keyset device, and manual actuation of the push buttoms PB and WOB, as previously described, when this flight data is determined in the central office, or reported by telephone, radio, or other communication facilities; provision is preferably made for reasons already noted to perform such posting and wipe-out operations entirely automatically in accordance with messages over a Teletype system from outlying fixes or any other points.

In the specific organization of parts and circuits illustrated for performing this automatic posting and wipe-out operation, it has been assumed that the posting and wipe-out messages may be transmitted from any one of a number of different points to a central office by the usual and well known Teletype system. Also, while it is evident that a Teletype line may be devoted exclusively to such posting and wipe-out messages, it has been assumed that such messages will be transmitted and received over the same line facilities used for communication of other information to the central office, such as general information regarding flights, weather reports, and the like.

Generally speaking, the equipment for providing automatic posting and wipe-out operations comprises means for segregating and routing posting and wipe-out messages received over the Teletype line to separate tape reperforators of the well known type; other means for feeding one or the other of the perforated tapes at the appropriate time past suitable pick-up means, such as feeler contacts, to selectively close circuits in accordance with the respective characters represented by the rows of perforations in the tape; and means for distributing these characters to suitable decoder units to provide for the selective energization of the control buses of the posting panel in conformity with the particular message, and also for automatically initiating a posting or wipe-out operation in substantially the same way as by manual actuation of the push buttons PB and WOB.

The specific arrangement of parts and circuits illustrated assumes the use of the well known stop-start type of Teletype system employing a starting pulse, five intelligence pulses in different combinations, and a stop or at-rest pulse. Since the operating characteristics of this Teletype system are well known and familiar to those skilled in the art, it will be sufficient to consider here how such system is employed in connection with the automatic posting and wipe-out operations desired.

Referring to Fig. 3A, the relay LR represents the normally energized line relay for the usual Teletype line, which is initially deenergized for the start pulse, and which is then intermittently energized and deenergized thereafter to provide marking or spacing pulses during one or more of the five successive code transmission intervals, but which is finally held in its energized position for the stopping pulse or at-rest period. A front contact 274 of this line relay LR is employed for operating single magnet reperforators, such as Models 14 and 20 described in the Bulletin No. 162 of the Teletype Corp., and also a single magnet general printer shown schematically in block form and preferably a tape recorder such as Model 14 described in the Bulletin Nos. 126 and 127 of the Teletype Corp.

In connection with the automatic posting and wipe-out operations, it is contemplated that these messages will be identified at the beginning by a distinctive routing character, such as the ($) sign for posting and (—) for wipe-out, followed by a begin-message character such as the "and" symbol (&); and further that each of these messages comprises a predetermined number of characters and is terminated by an end-of-message character, such as the exclamation mark (!). The routing characters ($) and (—) serve to route the messages to the appropriate posting or wipe-out reperforator, and the begin-message and end-of-message characters are employed for decoding and checking the integrity of the messages, in the manner later explained.

*Message routing and perforating.*—For the purpose of routing posting and wipe-out messages identified by the distinctive routing characters preceding each message to the separate reperforators, a routing decoder device has been shown diagrammatically to facilitate an explanation and understanding of the routing functions although it will be seen that appropriate contacts operated by the selector bars or the like of a regular Teletype printer may be employed to govern the reperforators in the same way.

Referring to Fig. 3A, the routing decoder device diagrammatically illustrated is controlled by front and back contacts 275 of the line relay LR, and in general comprises a motor-driven rotary distributor with a start magnet, which is set into operation by energization of the start magnet by an obvious circuit through back contact 275 of relay LR, contacts 276 closed with the distributor in the initial position only, contact 279 opened in the initial position only, and a contact arm 277 which moves during rotation of the distributor to connect five decoder relays 1RD, 2RD, etc., to the front contact 275 of the line relay LR, so as to permit selective energization of these decoder relays in accordance with marking or code pulses. These decoder relays 1RD, 2RD, etc. are held up by locking or stick circuits, including contacts such as front contact 278 for relay 1RD, and the contact 279 of the distributor open only in its initial position. Thus, the routing relays RD are selectively energized during each series of marking pulses for a character and those of such relays which are picked up remain stuck up until the distributor contact 279 opens at the end of the series following the execution period while arm 277 is on segment 281. During movement of the distributor from its fifth position to the initial position, its contact arm 277 wipes over a contact segment 281 to provide an execution circuit to govern the energization of a shift relay OSH, posting symbol relay PSY, and also a wipe-out symbol relay WSY in Fig. 3C, dependent upon the character transmitted and stored in the decoder relays 1RD, 2RD, etc at the time.

The shift relay OSH and the relays PSY and WSY governed by this routing decoder are assumed to be of the magnetic stick type operating their contact fingers to one position or the other depending upon which winding of the relay is momentarily energized, and holding their contact fingers in the last operated position until again energized. A relay of this type is disclosed for example in the patent to Hailes et al., No. 1,929,094 dated October 3, 1933.

When the transmission of Teletype messages includes the usual marking pulses 1—2—3—4—5 for shift to letters or the lower case and selectively picks up the routing relays 1RD, 2RD, 3RD, 4RD and 5RD in accordance with such code, the upper winding of the shift relay OSH is energized by a circuit readily traced from (+), through front contact 275 of relay LR, distributor arm 277 and contact sector 281, execution wire 282, front contacts 283 through 287 of relays 1RD, 2RD, etc. upper winding of relay OSH, to (—). The closure of this circuit thereby positions the contact finger 290 of this relay OSH to the lefthand position shown. When the usual character of marking pulses 1—2—4—5 is received corresponding to the code assigned to the figure shift, the other lower winding of the relay OSH is energized momentarily during the execution period by a circuit similar to that just traced, but including a back contact 287 of decoding relay 3RD, thereby shifting the contact finger 290 of the relay OSH to a right-hand dotted line position, and provide circuit connections to the selecting circuits through the contacts of the routing relays 1RD, 2RD, etc. to the windings of the relays PSY and WSY.

Assuming the symbol ($) has been chosen to identify a posting message, transmission of marking pulses 1—4 for this character while the shift relay OSH has been set for figures, causes energization of the upper winding of the relay PSY through front contacts 292, 295 of relays 1RD and 4RD and back contacts 293, 294, 296 of relays 2RD, 3RD and 5RD. This energization of the upper winding of relay PSY acts to shift its contact finger 297, having make-before-break contacts shown conventionally, from the upper position to the lower position, disconnecting the single magnet (not shown) of the posting reperforator from steady (+), and connecting it over wires 434 and 435 to (+) through the front contact 274 of the line relay LR. This operation occurs while the line relay LR is energized during the execution and at-rest periods; but when the relay LR is deenergized by the start pulse for transmission of the next character of the posting message, the reperforator is operated in the usual way to perforate the tape in accordance with such character.

In the type of posting message contemplated, the symbol ($) identifying such a message is followed by the beginning-of-message character, which is punched in the tape; and this character is followed by the transmission of characters, with such spaces or other punctuation as desired, to represent the flight identification, schedule time, altitude or the like, such as indicated in Fig. 4 for a typical posting message. The message is terminated with a suitable end-of-message character assumed to be (!), which is punched in the tape. The setting of the decoder relays 1RD, 3RD and 4RD in accordance with this end-of-message symbol (!) provides a restoring circuit through the lower winding of relay PSY through the contacts 301, 302, 303, 304 and 305 of the decoding relays; and the relay PSY is thus restored to the normal position shown during the execution period to open back contact 297 and disconnect the posting reperforator from the line relay LR and steadily energize its selector magnet.

In a similar manner, the contact 437 of relay WSY in Fig. 3C is operated by current flow over contacts 306, 307, 308, 309 and 310 of relays 1RD, 2RD, etc. and wire 436 in response to the transmission of the character (—) chosen to identify a wipe-out message to close a circuit over wires 435 and 438 for control of the wipe-out reperforator by contact 274 of the line relay LR; and the wipe-out reperforator is operated in the same manner until the end-of-message character (!) is received and punched in the tape, at which time energy is supplied over wire 439 to restore the relay WSY, the circuit connections performing these operations being similar to those previously described and not requiring detail explanation.

The system thus operates to route posting and wipe-out messages to separate reperforators where they are reproduced and stored in punched tapes until used to perform posting and wipe-out operations for the posting panel. As already noted, the number of new flight schedules transmitted and stored in the punched tape may at times exceed the capacity of the posting panel; but the wipe-out messages are stored in a separate tape and may be used to wipe-out schedules no longer needed in the posting panel and create vacant spaces as necessary, which would not be true if these wipe-out messages appeared in the same tape as used to store the new flight schedule or posting messages.

*Decoding and using posting messages.*—This operation involves feeding the perforated tape automatically at the appropriate time through a suitable pick-up device to energize the relays of the decoder units in accordance with the significant characters of this message; and if the number of characters in the message conforms with the prescribed number, and the message is properly terminated with the end-of-message character (!), then the posting operation is automatically performed in substantially the same way as when the push button PB is operated with the exception that the energization of the control buses for the posting panel is determined by the decoder units. Fig. 6D shows generally the real operations involved.

The type of pick-up means used and shown diagrammatically comprises five feelers 312 adapted to drop into corresponding holes in the tape to close a contact when a feeler magnet FM is deenergized. These feeler contacts 312 govern the energization of five buses 313 connected to the five contact arms 314, 315, 316, 317 and 318 of a posting distributor, and also connected to five code repeater relays CR1, CR2, CR3, CR4 and CR5 as indicated by the dashed line 319. A special printer for recording the posting messages is also preferably connected to these same buses 313, this printer being of the multiple magnet selector type, and having an execution or printing circuit connection in multiple with the feeler magnet FM.

The means for feeding the tape intermittently past the feelers 312 is illustrated diagrammatically as a feed wheel 322 having teeth engaging the usual feed holes in the tape, and this feed wheel 322 is suitably connected, as indicated by dotted lines, to a ratchet wheel 323 adapted to be advanced by a feed stepping magnet FSM of the same type herein before described for operating the space selector. The energization of this tape feed stepping magnet FSM engages its pawl 324 with the next tooth of the ratchet wheel 323 and also closes contacts 326 to provide an energizing circuit for the feeler magnet FM readily traced to raise the feelers 312. The closure of these contacts 326 also energizes a timing relay TMR, preferably made relatively quick to pick up and slow to release by the use of a conventional rectifier as shown. The energization of the timing relay TMR and opening of its back contact 327 deenergizes the feed stepping magnet FSM to allow the biasing spring 328 to pull down the pawl 324 and advance the ratchet wheel 323 and feed wheel 322 to move the tape one space, and bring the next row of punched holes under the feelers 312 all in a manner which can be readily seen without further explanation.

The posting distributor as shown diagrammatically, comprises five contact arms 314, 315, 316, 317 and 318 engaging fixed contacts in as many different positions as there are characters in the posting message or flight schedule data to be posted, such as 11 in the case of the typical posting message indicated in Fig. 4. These contact arms 314 through 318 of the posting distributor are moved together by a distributor stepping magnet DSM of the same type described from each contact position to the next when this magnet is deenergized. The posting distributor also includes contacts 331 shown diagrammatically which are closed only when the distributor is in the initial or first position, other contacts 332 opened only when the distributor is in this initial position; and other contacts 333 closed temporarily while the distributor is in its last active position corresponding with the last or end-of-message character in the prescribed posting message.

The posting distributor governs the selective energization of the relays of a plurality of decoder units, one for each digit or character of the flight data to be posted. These decoder units are alike, so that only one for the first digit of the flight number has been illustrated in detail, the others being indicated schematically in block form. The typical decoder unit shown comprises relays R1 to R5 connected to contacts of the different distributor arms 314, 315, 316, 317 and 318 respectively in the first active position corresponding with the second character of the message. It can be seen that these relays 1 to 5 are selectively energized in accordance with the energization of the buses 313 by the feeler contacts dependent upon the punched holes in the tape while the posting distributor is in such first active position, and the selective energization of these relays 1 to 5 establishes ten different circuit connections 0 to 9 inclusive for selective energization of the corresponding group of control buses for the posting panel. The relays 1 to 5 are maintained energized by stick or locking circuits through front contacts such as the contact 334 of a relay 1 and a master stick bus 335 to which energy is applied from (+), through a front contact 336 of a start relay STR, or through a front contact 450 for a start relay 1STR associated with the wipe-out distributor.

As shown in Fig. 3B, the circuit connections established by the decoder for the first digit of flight number are connected over wire 338 to (—) through back contacts 418 and 120 in multiple of relays AWO and SF (shown in Fig. 2A). Similarly, the circuit connections selected by the decoder for the second digit of flight number are connected over wire 339 to (—) through back contacts 419 and 119. Thus, these code selected circuit connections are deenergized during a wipe-out operation; but, the decoders for the different denominations of time and altitude, are not energized during a wipe-out operation and do not require such controlled connections to (—).

The apparatus associated with the wipe-out reperforator as in Fig. 3C is of the same character, and operates in the same manner, and the corresponding parts are conveniently designated with the same reference letters with the prefix 1.

Figure 5:
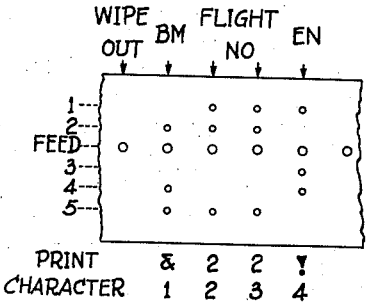

The wipe-out message, however, as indicated in Fig. 5, merely includes the flight identification number for the flight schedule to be wiped-out; and for convenience the same decoder units for flight number are controlled by the wipe-out distributor as the posting distributor, this joint use necessitating the special control by relays AWO and SF above mentioned. Obviously, separate decoder units for flight number could be used for the wipe-out apparatus, if desired.

*Typical automatic posting operation.*—Assuming that the system is in the normal inactive position shown, and that a typical posting message, such as indicated in Fig. 4, is punched in the tape by the posting reperforator during the reception of a posting message. As the tape is fed through the reperforator in connection with this punching operation, a sag develops in the tape between this reperforator and the tape feed wheel 322; and a suitable roller 342, or the like, resting on the tape and biased downward by a spring 343, moves downward as this sag develops to close a contact 344 and establishes a circuit for energizing the start relay STR. This circuit may be traced from (+), Fig. 3C through back contacts 345, 346, 347 of relays OP, WOR and CPP respectively, a sag contact 348 of the same type for the wipe-out tape in the position shown when there is no wipe-out message punched in this tape, wire 349, sag contact 344 for the posting tape, back contact 350 of full relay FL, wire 351, contacts 331 of the posting distributor in its initial position, windings of relay STR in Fig. 3B, wire 352, back contact 353 of relay 1STR in Fig. 3C, wire 354, back contact 355 of relay ER, wire 356, back contact 51 of completion relay CP, a normally closed contact of the clear-out button COB, and back contact 52 of relay SQ, to (—).

The start relay STR when thus energized is held up by a stick circuit through its front contact 359, which stick circuit maintains relay STR energized independently of the opening of contact 331 during operation of the posting distributor.

The energization of the start relay STR and closure of its front contact 360 in Fig. 3B establishes an operating circuit for the tape feed stepping magnet FSM in Fig. 3, this circuit being traced from (+), through front contact 360 of relay STR, front contact 361 of an overfeed tape relay OFT, wire 362, stepping magnet FSM, and back contact 327 of time relay TMR, to (—).

The stepping magnet FSM is thus set into operation to advance the tape intermittently past the feeler contacts. Assuming the posting message under consideration is the first one received since the last posting operation, the tape has to be fed by repeated operations of the stepping magnet FSM for the distance between the punched holes made by the reperforator and the feeler contacts in order to bring the first row of holes punched in the tape under the feelers. When this occurs, feeler contacts for positions 2, 4 and 5 are closed since there are punched holes for such positions for the begin-message character assumed; and this energizes the code repeater relays CR2, CR4 and CR5 to establish a circuit through the upper winding of a begin-message relay BM, which circuit may be traced from (+), through a contact 364 of a shift relay SH in the upper case or "figures" position shown through front and back contacts 365-369 of relays CR1, CR2, etc. now set for the "begin-message" character, upper winding of relay BM, to (—). The relay BM once energized is maintained energized by a stick circuit through its front contact 370 and the master stick bus 335 now energized through front contact 336 of relay STR. Relay SH is of the magnetic stick type and normally assumes the figures position during posting operations, but is operated under special message conditions hereinafter described.

This operation of energizing selected code repeater relays CR2, CR4 and CR5, and energization of relay BM occurs after the feed stepping magnet FSM is deenergized to open its contacts 326 and release the feeler magnet FM to close the feeler contact 312; and the timing relay TMR is made sufficiently slow releasing to permit such energization of these relays before back contact 327 of relay TMR closes to permit the next energization of the stepping magnet FSM and closure of its contacts 326 and energization of the feeler magnet FM to open the feeler contacts. When the timing relay TMR releases before the next operation of the feed stepping magnet FSM, the energization of the relay BM provides a circuit through its front contact 372 and front contact 373 of the start relay STR to the distributor stepping magnet DSM, wire 374 and back contact 327 of relay TMR, so that the posting distributor is operated from the position shown to the first active position in synchronism with feeding the tape from the punchings forming the begin-message character to the punchings representing the first digit of the flight number.

Consequently, the selective operation of the feeler contacts in accordance with this first digit of the flight number is distributed to the relays of the decoder unit for the first flight number digit, selectively energizing these relays to establish circuit connections to connect (—) to a control bus of the posting panel in conformity with the first digit of flight number punched in the tape.

The same operation of the tape feed stepping magnet FSM and distributor stepping magnet DSM continues for the other characters of the flight data punched in the tape to store this data in the appropriate decoder units. If, as indicated in Fig. 4 the significant characters for flight data are separated by spaces or other punctuation, the corresponding points such as 4 and 9 on the posting distributor are idle positions not connected to any decoding unit. It can be seen that the posting message or schedule data may comprise any desired number of characters, with spaces or other punctuation as desired, by employing a distributor having the proper number of active contact positions; and it should be understood that the posting message or schedule data indicated in Fig. 4 is merely typical or representative of flight schedules of this nature.

As previously noted the posting message for checking purposes is preferably designated with a special end-of-message character such as (!); and when the punched holes for this character are brought under the feelers by the deenergization of the feed stepping magnet FSM, the energization of the repeater relays CR1, CR3 and CR4 for this end-of-message character provides a circuit from (+), through polar contact 364 of relay SH in the figures position shown, contacts 377 through 381 of these code repeating relays to energize the upper winding of the end-of-message relay EM, which is then stuck up through its lower winding and front contact 382 by energy from the master stick bus 335.

The energization of the end-of-message relay EM in this way closes a front contact 384 to connect (—) over wires 385 and 374 to the stepping magnets FSM and DSM in multiple with the back contact 327 of the timing relay TMR, so that these stepping magnets FSM and DSM remain energized with their pawls engaged within the next teeth of their ratchet wheels, even though the relay TMR is energized. In other words, deenergization of the end-of-message relay EM establishes a locking circuit to hold the tape feed and distributor in the position for the last character terminating the message.

Assuming that the message includes the proper number of characters, the distributor is in its last active position at this time when the relay EM is energized, and the closure of the contacts 333 with the distributor in this position provides an energizing circuit for a relay DF from (+), through the winding of the relay DF, contacts 333 of the distributor, wire 385, initially through back contact 327 of relay TMR and later through front contact 384 of relay EM, to (—).

The energization of both the ralays DF and EM establishes a circuit from (+), through their front contacts 390 and 391 to energize the automatic posting relay AOP, which acts to post the data stored in the coder units in the posting panel in much the same way as when the relay OP is energized for a manual posting operation.

In connection with this automatic posting operation and referring to Fig. 2A, the energization of relay AOP opens at its back contact 55 the circuit for the relay SL, and closes a front contact 392 to energize the test bus TB of Fig. 2B, so as to test or check if a posting of the same flight number already appears in the posting panel. When the relay SL releases, after such test period, a circuit is established from (+) through back contact 68 of relay CP, front contact 393 of relay AOP and back contact 394 of relay SL and wire 431 to energize the space relay selecting bus SS. The opening of the back contact 89 of relay AOP disconnects (—) from the blanking bus BP so that the indicators in this space may be properly positioned.

It will be noted that, during this automatic posting operation, the relays OP and OPR are not energized, and hence the position of the manually operable setting dials DF1, DF2, etc. for flight number, time and altitude does not effect the energization of the control buses, which is determined at this time by the circuit connections made up through the contacts of the relays in the decoder units.

More specifically, the ten buses for the different numbers of the first digit of flight number (only three of which have been shown in Fig. 2B) are indicated by the dotted line 440 as connected to the wires numbered 0 through 9 in Fig. 3B and connected to the decoding contacts of the decoding relays R1, R2, R3, R4 and R5 shown for the first digit of flight number. These decoding contacts are connected to (—) through back contacts 418 and 120 in multiple of relays AWO and SF respectively. Thus, whenever a code in the punched tape representing a particular number for the first digit of flight number acts to energize these decoding relays, negative energy (—) is applied to a correspondingly numbered bus for the first digit of flight number; and the particular bus thus energized acts to position the flight number indicator for this digit for the proper space as selected in a manner previously described in connection with manual posting.

In a similar manner, the ten different buses for the second digit of flight number have been indicated by the dotted line 441 as connected to the decoding apparatus associated with the second digit of flight number. These buses are controlled by decoding contacts on their respective decoding relays in the same manner as disclosed for the first digit of flight number, and negative energy (—) is supplied to the proper bus in the same way. Referring to Fig. 2C the different sets of buses for time and altitude are indicated by dotted lines 442, 443, 444, 445 and 446 as extending to the decoding contacts of their respective decoders in Fig. 3B, and are energized in a similar way.

It might be noted that during this automatic operation the various manually operable dials such as DF1, DF2, DT2, DT3 are in their blank positions, but even though they are inadvertently left in opposite positions they can not be effective during an automatic operation since the relays OP and OPR are not energized during this operation.

When the indicators for the selected space have been properly positioned, the completion relay CP is energized in the same way as for a manual posting operation previously described, and this relay opens at its back contact 51 (Fig. 3D) the stick circuit for the start relay STR, which releases and opens its front contacts 369 and 373 to deenergize the tape feed and distributor stepping magnets FSM and DSM to advance the tape one space and restore the distributor to its initial position. The release of the relay STR and opening of its front contact 336 also deenergizes the master stick bus 335 to release the relays EM, BM, and various relays of the decoder units then energized.

When the completion relay CP again releases to close its back contact 51, the energizing circuit for this start relay STR is again prepared, and if in the meantime another posting message has been stored in the tape the sag contact 344 is closed, so that the start relay STR may again be energized to repeat the same operation for this subsequent message, and so on until all of the messages in the stored tape have been automatically posted. In this connection, it is assumed that the reperforator is provided with a ratchet or friction tape feed control device, so that the tape feed stepping magnet FSM and its associated feeder wheel 322 may pull the tape through the reperforator without interference to bring the last row of punched holes of a message under the feelers.

It may be pointed out here that, when all of the spaces of the posting panel are filled, and empty-full contacts 395 for all of the spaces are shifted from their solid line to their dotted line positions, a circuit is made up through these contacts 395, 395a, etc. in series, as shown in Figs. 3A and 7 to energize the full relay FL which opens its back contact 350, shown in Fig. 3A, in the energizing circuit for the start relay STR, so that in spite of the closure of the sag contact 344 due to the storage of posting messages in the tape, the start relay STR is not energized to initiate any further decoding and posting operation. As soon as a vacant space is created in the posting panel by some manual or automatic wipe-out operation, the full relay FL is released to close its back contact 350 and permit energization of the start relay STR to effect the automatic posting of the next message stored in the tape.

*Check on integrity of a posting message.*—It can be seen that the positioning of the indicators in the posting panel is dependent upon the energization of the associated control buses, which in turn are governed by the decoder units; and since these decoder units respond to any punching of holes in the tape for corresponding positions of the posting distributor, it is important for proper posting operation that the characters of flight number, time, and altitude should appear in the tape at the proper points with respect to the position of the distributor, otherwise erroneous and false data may be posted. For these reasons, it is proposed to employ a posting message or flight schedule message of a uniform and prescribed number of characters, starting with a begin-message character and ending with an end-of-message character, and to organize the tape feed and distributor equipment in such a way that an abnormal message lacking this prescribed number of characters will not be posted.

Referring to Fig. 3B, it can be seen that the automatic posting relay AOP is energized only if both relays DF and EM are energized to close their front contacts 390 and 391. The relay EM is energized by the end-of-message character, and the relay DF by the contacts 333 of the distributor closed only in its last active position. If the end-of-message character and the last position of the distributor occur concurrently, the relay AOP is energized to perform an automatic posting operation. Since the distributor is started by the energization of relay BM in response to the begin-message character, it can be seen that if the message lacks the proper number of characters, the concurrent energization of relays DF and EM does not occur, and there is no automatic posting operation.

Considering this checking feature more in detail, suppose some one of the prescribed characters of a posting message are omitted for some reason, perhaps by careless manipulation of the transmitting key board, then the end-of-message character (!) is registered by the energization of the relay EM and the tape feed and distributor stepping magnets FSM and DSM are locked up as previously described, before the distributor reaches the last active position to close its contacts 333 and energize the relay DF.

Similarly, if an extraneous character is introduced into the posting message in some way, the distributor reaches its active position and closes contacts 333 to energize relay DF to lock the tape feed stepping magnet FSM by closure of front contact 397 of relay DF, before the end-of-message character has been reached on the tape to energize relay EM.

In both of these cases, the relay AOP is not energized, and there is no automatic posting operation, nor energization of the completion relay CP to release the start relay STR. In short the system stalls.

In addition to creating this stalled or locked-up condition of the system in the case of the defective message, a suitable alarm is automatically given by the deenergization of the alarm relay ALR. The relay ALR is normally energized from (+), through front contact 393 of the relay OFT and back contacts 399 and 400 in series of relays DF and EM respectively, relay ALR, to (—). When the relays DF and EM are both energized at the end of a proper message, the relay ALR is maintained energized by a circuit through the front contacts 399 and 400 of these relays; but if either relay EM or DF is energized without the other, as in the case of a defective message, the energizing circuit for relay ALR is broken, and it releases to open at its front contact 402 the circuit to a suitable indicating lamp PK and to close at its back contact 402 a circuit to a bell BL, buzzer or other suitable audible alarm, adapted to be silenced by operation of a silencing lever or key SIL.

In this way, the fact that the system has stalled on account of a defective message is brought to the attention of the operator, and he may then examine the last message as printed by the posting printer to see if he can discover the difficulty. After such inspection of the message, as printed, he may call for further information or a repeat of the posting message, or take such other action as may be appropriate under the conditions. After such investigation of the situation, the operator by actuation with a clear-out button COB in Fig. 3D opens the stick circuit then holding the start relay STR energized, thereby restoring the apparatus to the normal condition; but there has been no automatic posting of the data represented by the defective message.

If the operator from inspection of the printed record can determine what the correct message should be, he may make the proper posting manually by positioning the setting dials and then actuating the posting push button PB. He can also manually make the correct posting or wipe-out operation after suitable communication with the person having transmitted the faulty Teletype message. The important fact is that there has been no erroneous or faulty posting of the defective message.

*Tape over-feed prevention.*—From the foregoing explanation, it can be seen that the tape feed stepping magnet FSM is started when the closure of the sag contact 344 shows a message has been punched in the tape, and that this tape feed is stopped by the end-of-message character, or if the distributor is advanced to its last active position following reception of the begin-message character. If a message, which is without the appropriate begin-message and end-of-message characters, should happen to be punched in the tape by the reperforator, due to careless manipulation by an operator or otherwise the tape feed mechanism would continue in operation and perhaps pull out all of the tape.

This is because the picking up of the start relay STR as a result of the closure of back contact 344 causes the stepping magnet FSM to be operated without a corresponding operation of the posting distributor magnet DSM so that the relay DF fails to pick up to stop operation of the stepping magnet FSM. Then, if the end-of-message character is also missing, the end-of-message relay EM is not picked up to stop operation of the stepping magnet FSM. Thus, improper characters at the beginning and end of a message would tend to result in the undesired continued feeding of the tape.

To avoid this contingency, an over-feed tape relay OFT is preferably provided, which is normally energized through a back contact 360 of the start relay STR, and may also be energized over a bus 404 through front contacts of any one of the code responsive relays CR1, CR2, etc., such as the front contact 405 for the relay CR1. This relay OFT is made sufficiently slow releasing by any one of the well known expedients, as indicated by the heavy base line, so as to maintain its armature in the attracted position for the relatively short time required for the tape feed device to advance the tape far enough to bring the first row of punchings made by the reperforator under the feelers. So long as there are punchings in the tape to actuate one or more of the feeler contacts and energize one or more of the code repeating relays CR1, CR2, etc. the relay OFT is maintained energized; but when tape without any punchings is pulled past the feelers by the type tape feed mechanism, then the intermittent energization of the relay OFT ceases, and this relay in time releases to open at its front contact 361 the energizing circuit for the tape feed stepping magnet FSM, and at the same time open its front contact 398 to deenergize the alarm relay ALR. The operator thus advised of the situation can by actuation of the clear-out button COB release the start relay STR to restore the apparatus to normal for subsequent operations.

*Automatic wipe-out operation.*—Automatic wipe-out Teletype messages are routed to the wipe-out reperforator by reason of the routing character (—) at the beginning of the wipe-out message as previously described in detail in connection with the routing of posting messages.

These wipe-out messages are punched in a separate tape and are employed in substantially the same manner as posting messages to cause an automatic wipe-out operation for the posting panel. The apparatus and circuit organization for accomplishing such automatic wipe-out operation are in effect a duplication of those for the automatic posting operation previously explained; and for convenient reference, the more significant parts of this wipe-out apparatus are given the same reference letters and numbers with the prefix 1. In view of this marked similarity in the structure and mode of operation, it would appear to be unnecessary to review the automatic wipe-out operation in detail, limiting consideration to some of the points of difference.

Since a wipe-out operation merely requires identification by flight number of the schedule to be wiped-out, a wipe-out Teletype message requires merely the flight number identification, as indicated for a typical message in Fig. 5, together with a suitable begin-message character and an end-of-message character, which for convenience are assumed to be the same as those used for posting message. Consequently, a wipe-out message comprises a smaller number of significant characters than the posting message, four being required for the typical wipe-out message shown in Fig. 5 in addition to the routing character (—) which is not punched in the tape; and accordingly, the five arms 407—411 of the wipe-out distributor have only four active positions. If these four active positions are distributed for one complete revolution of the distributor arms as in the arrangement shown, it is considered desirable to employ suitable gearing 513 between this distributor and the stepping magnet ratchet wheel 451 so that such stepping structure may have any convenient number of stepping positions.

Since decoder units for the different digits of flight number, with their connections to the control buses of the posting panel, are required for the automatic posting operation, it is convenient to use these same decoder units for the automatic wipe-out operation, by connecting the contact points for the distributor arms 407—411 to the relays of these decoder units by buses as indicated by the dash lines 412 and 413. For this reason, it is necessary to provide the back contacts 418 and 419 of the relay AWO and back contacts 119 and 120 of relay SF as shown in Fig. 2A to control the connection from (—) to the flight number decoder unit for the first digit and also similar contacts for the second digit flight number decoder unit, in a manner not required for the other decoder units, in order to disconnect (—) from the contacts of these flight number decoder units, when the relay AWO is energized for an automatic wipe-out operation, as soon as the relay SF is energized by location of the schedule to be wiped-out, so as to deenergize the flight number control buses of posting panel and permit blanking of the flight number indicators for such wipe-out operation. The other decoder units have their selected bank of contacts connected directly to (—), i. e. their wires corresponding to wires 338 and 339 are connected to (—) as indicated by wires 456, 457, 458, 459 and 460.

At the end of the operation of decoding a wipe-out message of the proper number of characters terminated by the end-of-message character, the concurrent energization of relays 1DF and 1EM cause energization of the automatic wipe-out relay AWO in the same way as the automatic posting relay AOP is energized. Generally speaking, the energization of the relay AWO results in a wipe-out operation in substantially the same way as when the relay WOR is energized by manual actuation of the button WOB, the flight number of the posting to be wiped out, however, being that set up in the flight number decoding units, instead of that set up on the manually operable setting dials.

Considering the circuit connections involved in this automatic wipe-out operation, and referring to Fig. 2A, the energization of the automatic wipe-out relay AWO closes a front contact 416 in multiple with the front contact 124 of the manual wipe-out relay WOR to provide energization of the space selecting bus SS when relay SF is energized; the front contact 417 of relay AWO energizes the test bus TB; and the back contacts 418 and 419 of this relay AWO disconnect at this point (—) from the wires 338 and 339 extending to the flight number decoders of Fig. 3B, so that when the same flight relay SF is energized to open its back contacts 119 and 120, the decoders are ineffective to govern the energization of the flight number control buses and the blanking operation of the associated indicators may occur.

It will be noted with reference to Fig. 2A, that the front contacts 117 and 118 of relay WOR when closed for manual posting with relay WOR energized, also disconnect wires 338 and 339 from contacts 119 and 120 of relay SF. This is so that the (—) energy can be disconnected from the flight number buses when relay SF picks up during a manual wipe-out operation in spite of the fact that relay AWO is deenergized closing back contacts 418 and 419. Also, the back contacts 418 and 419 of relay AWO connect (—) through the wires 338 and 339 in multiple with the contacts 119 and 120 so that the flight number decoder contacts of Fig. 3B can apply negative potential to the selected flight number buses during an automatic posting operation in spite of the fact that relay SF picks up during such operation and opens its back contacts 119 and 120. In this way, the decoder contacts for the flight number can be governed in part by the relay SF also associated with the manual posting control, and can be used both for automatic posting and automatic wipe-out control.

The alarm relay 1ALR and operation of its contact finger 414 actuates the same bell BL or audible signal over a circuit including wire 415, but extinguishes a different indicating lamp WOK, to enable the operator to tell whether the abnormal operation causing the audible signal relates to the posting apparatus or the wipe-out apparatus.

The various features of the automatic wipe-out operation in other respects are the same as those previously explained for the automatic posting operation, and can be readily understood from this previous explanation. For example, the energization of the start relay 1STR by closure of the back points of the sag contact 348 for the wipe-out tape causes the feeding of the tape and operation of the wipe-out distributor. This in turn energizes relay 1BM and 1EM at the beginning and end of the message and so on, involving the same circuit connections as previously described, except for obvious minor differences, such as the omission of the back contact 350 of the full relay FL from the energizing circuit for the start relay 1STR governing the wipe-out operation.

*Rejecting corrected messages.*—In the transmission of a posting or wipe-out message over a Teletype system by manipulation of the keyboard in the usual way, the sending operator may realize or notice an error in transmission before the message is completed, perhaps from observation of the printed record made before him during the transmission. In such a case, the operator may avoid unnecessary stalling of the system for a defective message, or prevent posting of wrong data, by transmitting a suitable error symbol, such as the character (?) comprising marking impulses 1—4—5. When a message punched in the tape and including such an error character is fed past the feeler contacts, this error character energizes code repeater relays CR1, CR4 and CR5 to close a circuit readily traced from (+), through front contact 422 of relay CR1, back contact 423 of relay CR2, back contact 424 of relay CR3, front contact 425 of relay CR4, and front contact 426 of relay CR5, wire 427, relay ER in Fig. 3D to (—). This energizes relay ER to open its back contacts 355 to interrupt the stick circuit then maintaining energized either the relay STR or ISTR, as the case may be. The effect of this is to reject this message. As a result of such deenergization of the relay STR, for example, the tape feed stepping magnet FSM stops, and the distributor stepping magnet DSM is operated by a circuit including interrupter contacts 401, off-normal contacts 332, and back contact 373 of relay STR, until the distributor has been returned to its initial position. The relay STR may then be again energized to initiate another operation during which the succeeding new and correct message may be decoded and posted.

This same operation is characteristic of the wipe-out apparatus.

This method of correcting the message is, of course, applicable only if the sending operator knows of the error and sends the error character before the message is completed; but this feature does afford operators the facilities of correcting messages during transmission and avoid false posting or wipe-out operations, or the unnecessary stalling of the system for a defective message, that might otherwise occur.

*Other Teletype messages for the operator.*—In addition to transmitting and decoding posting and wipe-out messages for automatically controlling the indicators in the posting panel, it is contemplated that conditions are likely to exist where it is desirable to bring to the attention of an operator, supervising the movement of flights, other kinds of special messages about approaching flights coming under his jurisdiction, such as priority rights, operating limitations of certain flights, and the like.

Special messages of this character may be transmitted over the Teletype facilities in the regular way and routed to the posting reperforator by sending the appropriate routing character, and if such message lacks the prescribed begin-message character such as the "and" sign (&), the posting distributor and decoder units will not respond to the characters of such a special message. This special message in the tape, however, will be printed on the printer governed by the feelers for the inspection of the operator. This special message should be terminated with the prescribed end-of-message character (!) which will cause energization of the relay EM to lock the tape feed stepping magnet FSM in the same manner previously described, and give the visual signal and audible alarm to attract the attention of the operator to this special message.

The operator can then restore the system to normal by actuation of the clear-out button COB in the regular way.

In connection with this operation, the shift relay SH is governed by the code repeater relays CR1, CR2, etc. energized by the feeler contacts so that when such special message involves letters and a regular shift character for the lower case is transmitted and punched in the tape, this shift relay SH will respond to such punchings by obvious circuit connections the same as for shift relay OSH, to shift its contact finger 364 from the closed position shown to the dotted line position, and thereby prevent energization of either relay BM or EM by the same marking pulses used for letters as those for the particular characters intended to energize these relays. Under normal operating conditions, a special message is terminated by the end-of-message character (!) which involves a prior transmission of the usual character for upper case or figure shift, and this restores the shift relay SH to the position shown to permit energization of the relay EM.

An extra contact 429 on the clear-out button COB is preferably provided for energizing the lower winding of the shift relay SH as shown in Fig. 3B, in order that this relay may be restored to the proper position for regular posting operations in the event that a special message for some reason should not be properly terminated by the end-of-message character, and the system should be locked up by the operation of the over-feed relay OFT, with relay SH in the wrong position.

In this way, the organization of this invention enables special messages regarding the movement of flights, in addition to prescribed posting and wipe-out messages, to be brought directly and definitely to the attention of the operator for such action as may be appropriate, and serves to segregate such significant message from the wide variety of Teletype messages that are ordinarily sent into a central office in connection with the movement of airplanes. This particular feature, of course, as well as some of the other facilities provided by the system as disclosed, is optional, and may be omitted without altering the operation of the system in other respects.

*Interlocking conflicting operations.*—Since the posting and wipe-out operations, both manual and automatic, and also the time sequencing operation utilize the same control buses of the posting panel, it is necessary, in order to avoid conflict and false operation, to provide suitable interlocking means to prevent these conflicting operations from occurring at the same time, with such preference or priority as is considered expedient.

In this connection, referring to Fig. 2A, it will be noted that the energizing circuits for each of the manually operable relays OP and WOR include back contacts 48 and 115 of the other relay, so that both of these relays may not be energized at the same time by actuation of the bush buttons PB and WOB. Also, these manually operable relays OP and WOR may not be energized by any manual manipulation if either of the start relays STR or ISTR is energized to open the back contacts 49 and 50; and consequently, no manual posting or wipe-out operation may be initiated while an automatic posting or wipe-out operation from the punched tapes and coding units is in progress. Further, the relays OP and WOR may not be energized by manual manipulation while the sequence relay is energized for sequencing operation and opens its back contact 52.

Figure 3D:
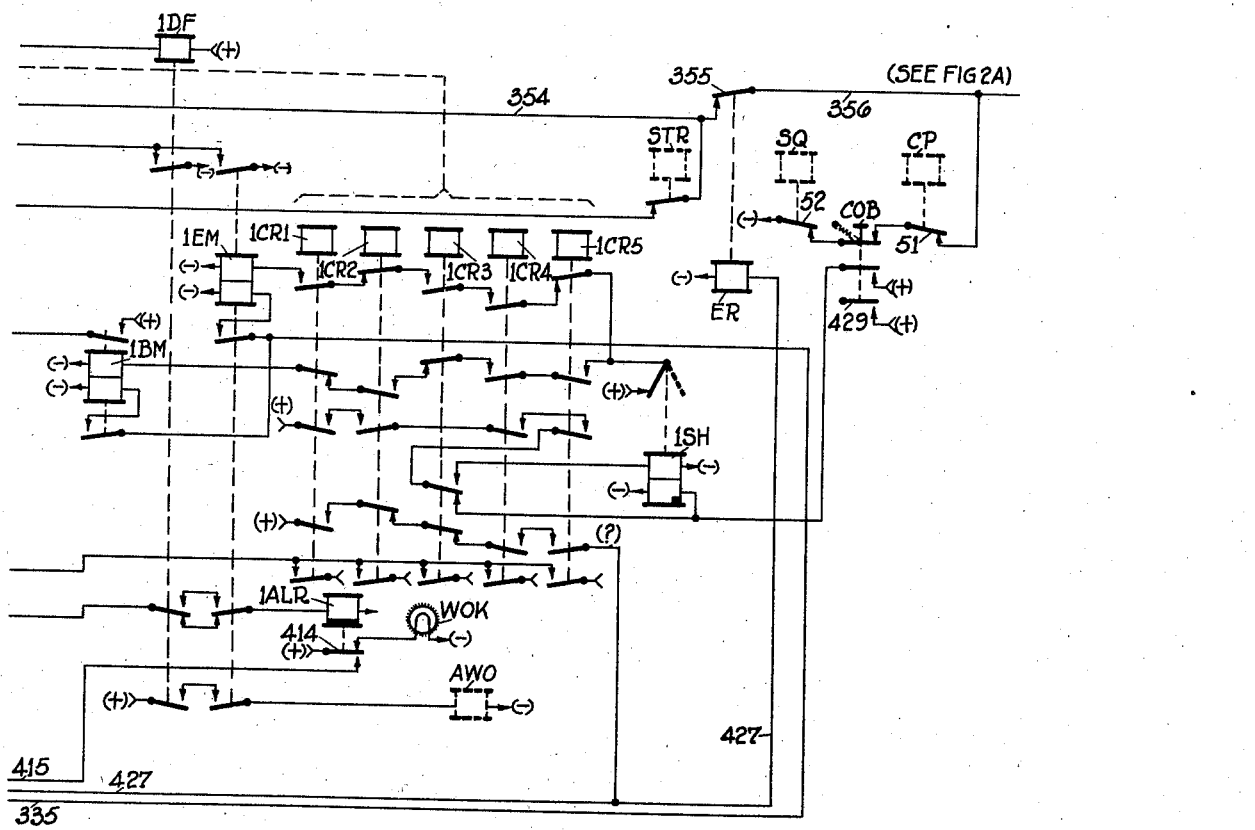

Referring to the start relays STR and ISTR, controlling the automatic posting and wipe-out operations respectively, the connection from (+) to the energizing circuits of both of these relays includes back contacts 345, 346 and 347 of the relays OP, WOR and CPP as shown in Fig. 3C, and the connections to (—) for both of these relays includes a back contact 52 of relay SQ as shown in Fig. 3D, as well as the back contact 51 of relay CP and the clear-out button COB. Consequently, irrespective of the condition of the sag contacts 344 and 348 governing the energization of the relays STR and ISTR, these relays may not be energized while a manual posting or wipe-out, or a sequencing operation is in progress.

Provision is also made for interlocking the energizing circuits for the two start relays STR and ISTR so that either an automatic posting or a wipe-out operation may occur, but not both. As shown, the energizing circuit for the start relay STR includes a sag contact 348 associated with the wipe-out tape and closed only when there is no wipe-out message in this tape. Also, the energizing circuit of relay STR includes the back contact 353 of relay ISTR in Fig. 3C. This arrangement gives wipe-out messages the preference, and postpones the energization of the start relay STR for posting operations until all of the wipe-out messages in the tape have been executed. This preference is provided on the assumption that wipe-out operations are of more significance in keeping the flight data up to date than new posting messages; but of course, the circuits can be arranged in an obvious way to change this preference.

It is contemplated that, while posting or wipe-out messages may be stored in the perforated tapes, the operator may have occasion to make some manual posting; and in order that he may do so, the repeater relay CPP for the completion relay CP is provided to prepare the energizing circuits by closure of its back contact 347 in Fig. 3C for the start relay STR or ISTR, only after energization of the posting relay OP or wipe-out relay WOR is possible upon closure of the back contact 51 of relay CP. With this arrangement, if the operator holds down the push button PB or WOR, he may initiate a manual posting or wipe-out operation as soon as any automatic operation in progress is ended, in spite of the fact that additional posting and wipe-out messages are stored in the perforated tapes.

Regarding the sequencing operation, it is contemplated that this operation may well be postponed until all posting and wipe-out messages stored in the perforated tapes have been executed, because any one of these stored messages, particularly a wipe-out message, may change the time sequence, and any previous operation of the sequencing means would be premature and unnecessary. Accordingly, the energizing circuit for the relay SA as shown in Fig. 2A for governing the operation of the sequencing relay SQ includes in series sag contacts 145 and 146 closed only if there are no messages stored in either the posting or wipe-out tape. The sag contact 146 for the posting tape is also shunted by front contact 143 of the full relay FL, since the sequencing operation is appropriate when the posting panel is full, even though there are posting messages stored in the perforated tape.

From this explanation and consideration of the circuit connections, it is believed that it can be understood how the necessary interlock between conflicting functions is provided, with certain preferences considered desirable.

Having described a system for posting and displaying data for scheduled flights as well as effecting the display of such data in a sequence in accordance with the scheduled times for the flight schedules then posted, as one specific embodiment of the present invention it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention except as limited by the appended claims.

What we claim is:

1. In a system of the character described, the combination with a posting panel having a number of posting spaces each including a plurality of changeable indicators for displaying different flight schedules including a scheduled time, a sequence panel having a plurality of posting spaces including like changeable indicators, time sorting means acting automatically to identify successively the flight schedules posted in said posting panel in chronological order of their scheduled times, and means operating automatically in conjunction with said time sorting means for positioning the changeable indicators in the successive posting spaces of said sequence panel to conform with said flight schedules successively identified by said time sorting means.

2. In a system for supervising the movement of airplanes or other movable vehicles, a posting panel having a number of posting spaces each including a plurality of multiple-position circuit control units, said circuit control units being operable from blank positions to represent different flight schedules including a scheduled time, means for operating and restoring to the normal blank position said circuit control units in various posting spaces of said posting panel from time to time to conform wth the existing flight schedules, a sequence panel having a plurality of posting spaces each having a plurality of changeable indicators for displaying the flight schedules including the different denominations of time, and means operating automatically to sort over the time schedules then standing in the posting panel and position the indicators in the sequence panel to provide a reposting of the flight schedules in the successive posting spaces of the sequence panel in the chronological order of their scheduled time.

3. In a flight scheduling system, storage means for individually storing a plurality of different time schedules in different posting spaces, means for adding new time schedules one at a time to said storage means, wipe-out means for removing any selected time schedule from said storage means, a sequence display panel having a plurality of posting spaces each including changeable indicators, time sorting means operable to identify said posting spaces of said posting panel one at a time in a sequence determined by the chronological order of the time schedules posted in such spaces, and posting means for selecting the posting spaces of said sequence diplay panel, one space at a time, in step with the identification of said time schedules by said time sorting means, said posting means acting upon the selection of each space to position the changeable indicators of that space to correspond to the time schedule then identified by said time sorting means.

4. In a system for scheduling flights, a posting panel having a number of posting spaces each including a plurality of multiple position circuit controlling units operable from normal blank positions to different positions to represent the data of flight schedules including the denominations of its scheduled time, a sequence panel having a plurality of changeable indicators for displaying the data of a flight schedule, time sorting means including a multiple position circuit controlling unit for each denomination of time positioned to identify the lowest digit of the corresponding denomination of time for all of the posting spaces of the posting panel also having the lowest digit for the next preceding higher denomination of time to thereby identify the next schedule in chronological order, means acting when the schedule time in a space of said posting panel has been identified for rendering the multiple position circuit controlling units ineffective to act on said time sorting means, means causing said time sorting means to repeatedly operate until all of said schedules have been identified with respect to their chronological order, and means operating step by step in cooperation with said time sorting means for positioning the changeable indicators in the successive posting spaces of said sequence panel to conform with the positions of the multiple circuit controlling units of said time sorter for the time schedule portion of the flight data successively identified by said time sorting means, but with respect to the remaining data of each flight schedule causing the control of the changeable indicators directly from the multiple position devices of said posting panel.

5. In a system for determining the time sequence of a number of flight schedules, a posting panel having a plurality of posting spaces each including a multiple position posting unit for each denomination of time of a twenty-four hour day, means for positioning said posting units for one or more posting spaces to register different scheduled times, time sorting means operable progressively during different successive steps of an operating cycle with respect to each denomination of time starting with the highest denomination, said time sorting means acting during each step of its operating cycle to identify the posting space or spaces having posted therein the lowest digit of the corresponding denomination of time and also rendering the posting unit for the next higher denomination of time in the same posting space or spaces effective to govern the operation of said time sorting means during the next step of that operating cycle, whereby said time sorting means at the end of its operating cycle has identified the posting space including the earliest scheduled time, a sequence panel including like posting units, posting means acting after each cycle of operation of said time sorting means for reproducing in the next vacant posting space of said sequence panel the scheduled time then identified as the earliest by said time sorting means, said posting means also acting after its operation is completed to render the posting units in the posting space of the posting panel just reproduced in the sequence panel ineffective to control subsequent operation of the time sorting means, and means causing said time sorting means and said posting means to operate repeatedly for a desired number of the time schedules in the posting panel.

6. In a flight scheduling organization, a posting panel having a number of posting spaces each including a plurality of changeable indicators operable from normal blank positions to different indicating positions for displaying a flight schedule including a scheduled time, means for operating and restoring to the normal blank positions said changeable indicators in the various posting spaces from time to time to conform with the different existing flight schedules, a sequence panel having a limited number of posting spaces less than the number of posting spaces for said posting panel and each space having a plurality of changeable indicators operable to different indicating positions for displaying a flight schedule including a scheduled time, time sorting means automatically operating to sort over the flight schedules then standing in the posting spaces of said posting panel to identify the chronological order of their scheduled times, and means automatically acting with respect to a limited number of said flight schedules identified as being earliest in time order to reproduce such flight schedules in the posting spaces of said sequence panel arranged in the successive limited number of spaces in the chronological order of their scheduled times as identified by said time sorting means.

7. In a flight scheduling system, the combination with a posting panel having a number of posting spaces each including a plurality of changeable indicators for displaying different flight schedules including the different denominations of a scheduled time, time sorting means for progressively comparing all posting spaces for each denomination of time, beginning with the highest denomination to find the space or spaces having the lowest digit for such denomination among those spaces that also had the lowest digit for the preceding higher denominations of time, whereby that particular space having the earliest scheduled time among those schedules then effective is identified, a sequence panel having a plurality of posting spaces including changeable indicators, means for selecting said posting spaces of said sequence panel one at a time in a predetermined order and one for each identification of a flight schedule of said posting panel, said means at the same time operating to control the changeable indicators of the selected posting space to reproduce the flight schedule of said posting panel then identified, and means acting when a posting space of said posting panel is once identified to render that space ineffective until after all posting spaces of said posting panel have been identified in the proper chronological order according to the time schedules posted therein, whereby successive operations of said time sorting means effects the reproduction of the time schedules in the sequence display panel in proper chronological order.

8. In a flight scheduling system, a posting panel having a plurality of posting spaces each including a plurality of multiposition circuit controlling devices operable to different positions from a blank position to represent different flight schedules including the different denominations of time, control means for operating and restoring to their blank positions said circuit controlling units to correspond with the existing flights scheduled, a sequence panel having a plurality of posting spaces each including a plurality of changeable indicators for displaying the flight schedules including the different denominations of time, time sorting means operable when initiated to sort over the existing flight schedules in the posting spaces of said posting panel with respect to their different denominations of time to identify said posting spaces of that panel in an order corresponding to the chronological order of their different flight schedules, means for causing the existing flight schedules of said posting panel to be reproduced in the posting spaces of said sequence panel in that order in which they are identified, by said time sorting means, and means for initiating the operation of said time sorting means upon each change occurring in the then existing flight schedules of said posting panel due to the operation of said control means.

9. In a flight scheduling system, a posting panel for changeable indicators having different posting spaces upon which schedule times can be displayed, means for causing different scheduled times to be displayed in different posting spaces on said posting panel disregarding the chronological relation of their scheduled times, a sequence displaying panel having changeable indicators for different posting spaces upon which different scheduled times can be displayed, time sorting means effective for successively selecting the time schedules displayed on said posting panel in a sequence depending upon their chronological time order, and posting means for causing the posting spaces of said sequence displaying panel to be selected in order one at a time for each time schedule selected by said sorting means and controlling the changeable indicators of each such posting space to display the time schedule then selected, whereby said sequence displaying panel shows said time schedules in an order dependent upon the times they represent.

10. In a flight scheduling system, a posting panel having a number of posting spaces each including a plurality of multiple position circuit controlling units operable from normal blank positions to different positions to represent the data of a flight schedule including the different denominations of time of a twenty-four hour clock, a sequence panel having a plurality of posting spaces each including changeable indicators for displaying the data of a flight schedule, time sorting means acting automatically to successively identify the flight schedules posted in said posting panel in the chronological order of their scheduled times, said time sorting means including means to complete the sorting of the flight schedules for one day before identifying the order of the flight schedules for the next day when any next day schedules are posted in said posting panel, and means operating step by step in cooperation with said time sorting means for positioning the changeable indicators in the successive posting spaces of said sequence panel to conform with the flight schedules successively identifed by said time sorting means.

11. In a flight scheduling system, a posting panel having registration spaces each including a number of changeable indicators operable to different positions to represent the data of a flight schedule, a Teletype receiver apparatus for receiving flight schedule code messages over a communication channel and each such message comprising a plurality of code characters, said receiving apparatus also being effective for making a punched tape record of each code message, decoding means governed by the punched tape record for each flight schedule code message reported thereon so as to assume distinctive conditions in accordance with the entire message, and posting means effective to initiate operation of the indicators of the next vacant registration space of said posting panel and causing such indicators to assume positions in accordance with the code message then conditioning said decoding means only provided said decoding means has been acted upon by a predetermined number of code characters.

12. In a flight scheduling system, a posting panel having a plurality of registration spaces each including a number of changeable indicators operable from normal blank positions to different positions to represent the data of a flight schedule, a Teletype receiver for receiving various messages over a communication channel including new flight schedule code messages comprising a begin message symbol and an end-of-message symbol marking the beginning and ending of a predetermined number of code symbols, and posting means initiated and governed by said Teletype apparatus to operate the changeable indicators of the next vacant space to positions in accordance with the next code message received by said Teletype receiver, said means being initiated only providing there is said predetermined number of code characters to constitute any given flight schedule code message.

13. In a flight scheduling system, a posting panel having a plurality of registration spaces each including a number of changeable indicators operable from normal blank positions to different positions to represent the data of a flight schedule Teletype receiver for receiving various messages over a communication channel including flight schedule code messages comprising a begin message character, an end-of-message character and a predetermined number of intervening characters, apparatus governed by said receiver for making a punched tape record of each code message for a new flight schedule and including said begin message character and said end-of-message character, step-by-step decoding means initiated by said begin message character to take a predetermined number of steps corresponding to said predetermined number of schedule characters plus an added step for said end-of-message character, and posting means for causing the automatic posting of each decoded flight schedule only if said step-by-step decoder assumes its last active position corresponding to the end-of-message character, said posting means operating the changeable indicators of the next vacant registration space to positions in accordance with the data of the flight schedule then decoded by said step-by-step decoder, whereby a flight schedule is automatically posted in response to the reception of a Teletype message only providing such flight schedule message includes a proper number of code characters.

14. In a flight scheduling system, a posting panel having a plurality of registration spaces each including a number of changeable indicators operable from normal blank positions to different positions to represent the data of a flight schedule, a space relay for each registration space acting to initiate operation of the indicators for that space when it is picked up, a set of buses associated with the different corresponding indicators of each space, each set having a bus for each position of the indicators, a correspondence relay for each indicator energized when the associated indicator has been operated to a position corresponding to a selectively energized bus of its set, said correspondence relay for that indicator then acting to prevent its further operation, means for energizing a selected bus of each set relating to flight identification to thereby locate the registration space having a certain flight schedule by energizing the correspondence relays for certain indicators of that space, circuit means for picking up the space relay for that particular space having its correspondence relay means picked up, means responsive to control by said correspondence relays for flight identification for automatically removing energy from said sets of buses when said correspondence relays relating to flight identification for a particular space have been picked up, other means for energizing the blank positions of each indicator in the selected space, and stick circuit means for each space relay acting to hold that relay energized when once picked up until all of the indicators have assumed positions with their correspondence relays energized whereby any desired flight schedule may be located and caused to be wiped-out automatically by the restoration to blank positions of the indicators upon which such schedule has been posted.

15. In a flight scheduling system, a posting panel having a plurality of registration spaces each including a number of changeable indicators operable from normal blank positions to different operated positions to represent the data of a flight schedule, posting apparatus effective to initiate into operation the changeable indicators of the next vacant registration space to cause their operation to positions in accordance with the data of a new flight schedule, and means including a by-pass switch for each registration space manually operable for rendering the changeable indicators of any selected space unresponsive to said posting means in a manner to cause said posting means to initiate the changeable indicators of the next succeeding posting space when it becomes effective to initiate operation of indicators for the next flight schedule to be posted whereby any desired registration space can be rendered inactive when an operator so desires.

16. In a flight scheduling system, a posting panel having a plurality of registration spaces each including a number of changeable indicators operable from normal blank positions to different operated positions to represent the data of a flight schedule, Teletype receiving apparatus governed over a communication channel for receiving different flight schedule messages, automatic means governed by each new message for effecting a posting operation to actuate the changeable indicators of the next vacant registration space of said posting panel to positions in accordance with such message, manually governable means for effecting a posting operation to actuate the changeable indicators of the next vacant registration space of said posting panel to positions in accordance with the data of a new flight schedule, wipe-out means governed both by said Teletype receiving means and by said manually governable means for causing the operation of the changeable indicators of any selected registration space for restoration to their normal blank positions, a timing mechanism set into operation upon the initiation of each posting operation for measuring a predetermined time greater than that time normally required for a posting operation, means for stopping the operation of said timing mechanism upon the completion of each posting operation, and means for giving a distinctive indication at the end of said predetermined time measured by said timing mechanism in the event that the posting operation which initiated the timing mechanism has not yet been completed and stopped the timing operation before the end of such predetermined time.

17. In a flight scheduling system, a posting panel having a plurality of registration spaces each including a number of changeable indicators operable from normal blank positions to different positions to represent the data of a flight schedule, one Teletype apparatus for making a punched tape record of each code message for a new flight schedule to be posted, another Teletype apparatus for making a punched tape record of each code message identifying a flight schedule to be wiped-out, a Teletype receiver for receiving various messages over a communication channel and routing the new flight schedule code messages to said one Teletype apparatus and the wipe-out code messages to said another Teletype apparatus, posting means initiated and governed by said one Teletype apparatus and its punched tape record of a new flight schedule to operate the changeable indicators of the next vacant registration space to positions in accordance with the data of such schedule, wipe-out means initiated and governed by said another Teletype apparatus and its punched tape record of a schedule to be wiped-out to identify the registration space representing the data of that schedule and cause the restoration of the changeable indicators of the identified space to their normal blank positions, and means interlocking said posting means and said wipe-out means to allow only one to be effective at any one time with respect to said posting panel.

18. In a flight scheduling system, a posting panel having a number of registration spaces each including a number of changeable indicators operable from normal blank positions to other positions to represent the data of a flight schedule, a posting reperforator governed only by code messages constituting the data of a new flight schedule for making a punched tape record of such data, a wipe-out reperforator governed only by code messages constituting the identification of a flight schedule to be cancelled for making a punched tape record identifying such flight schedule, posting circuit means governed by each flight schedule record punched on said tape by said posting reperforator for operating the changeable indicators of the next vacant space of said posting panel to positions to display the data of such schedule messages, whereby the reception of a plurality of flight schedule posting messages causes a succession of operations of said posting circuit means, wipe-out circuit means governed by each flight schedule identified on the tape record punched by said wipe-out reperforator for identifying the registration space in which such schedule is displayed and causing the changeable indicators of that space to be restored to their normal blank positions, whereby the reception of a plurality of flight schedule wipe-out messages causes the successive operation of said wip-out circuit means, and interlocking circuit means allowing said wipe-out circuit means to be effective in preference to said posting circuit means, whereby said wipe-out circuit means can be effective to cancel posted flight schedules to provide vacant registration spaces for new flight schedules when said posting reperforator records more new flight schedules on its tape than can be posted on said panel at any one time.

19. In a traffic control system for airways, a posting panel having a number of registration spaces for posting flight schedules including changeable indicators for the different digits of flight number, time and altitude, a set of buses for each of said different digits each set having a bus corresponding to the different positions of the indicators of the different spaces for that digit, posting means including a posting relay effective when energized to initiate the operation of the indicators of any selected space to cause them to assume positions corresponding to the energized bus of their respective sets, said posting relay being provided with a stick circuit to maintain it operated, means for selectively energizing a bus of each set in accordance with a flight schedule when said posting relay is energized, means associated with said registration spaces to automatically cause the selection of the next vacant space when said posting relay is energized, whereby the indicators of that particular space are initiated into operation, a correspondence relay associated with each indicator for causing that indicator to cease its operation when that indicator has assumed a position corresponding to the energized bus of its respective set irrespective of the continued selection of the corresponding registration space, a completion relay associated with said panel and having a completion bus extending to all registration spaces of the panel, means for effecting the energization of said completion bus when any registration space is selected if all of the correspondence relays for the several indicators of that space are energized, and means acting upon the energization of said completion relay for causing the opening of the stick circuit for said posting relay and the restoration of the posting means to a normal inactive condition.

20. In a flight scheduling system, a posting panel having a plurality of registration spaces each including a number of changeable indicators operable from normal blank positions to different operated positions to represent the data of a flight schedule, Teletype receiving apparatus governed through the medium of a communication system for receiving different flight schedule messages, automatic means acting when governed by a new flight schedule message for causing operation of the changeable indicators of the next vacant registration space of said posting panel to positions in accordance with such message, manually governable posting means acting when rendered effective to cause a posting operation to actuate the changeable indicators of the next vacant registration space of said posting panel to positions in accordance with the date of a new flight schedule, wipe-out means acting when rendered effective by either said Teletype receiving means or manually governable means for causing the operation of the changeable indicators of any selected registration space to their normal blank positions, and circuit means interlocking said automatic means, said manually governable posting means and said wipe-out means in a manner to allow only one of such means to be rendered active at the same time.

21. In a traffic control system for airways, a posting panel having a number of registration spaces for posting flight schedule data and including changeable indicators for the different digits of flight number, time and altitude, a set of buses for the different digits of flight number each set having a bus for each position of the indicators of the different spaces belonging to that digit, a flight number verification means associated with each registration space and rendered effective only if the position of the indicators in that space for all digits of flight number correspond with the flight number buses then energized, wipe-out control means capable of being rendered active, flight number identifying means rendered active by said wipe-out control means for selectively energizing said flight number buses in accordance with the flight number of a schedule to be wiped-out, space selecting means for each registration space effective when actuated for causing the operation of the indicators of such space to their blank positions if said wipe-out control means is then active, means rendered effective when the flight number verification means for any space becomes effective if said wipe-out control means is then active for actuating said space selecting means for the corresponding space and at the same time causing the deenergization of all of said sets of buses, whereby said indicators of the selected space are restored to their blank positions, and means acting when the indicators of the selected space are restored to their blank positions for also restoring said wipe-out control means to an inactive condition.

22. In a time sorting organization, a posting panel having a plurality of registration spaces each having a number of changeable indicators including one for each different digit of the denominations of time for a 24-hour clock, a set of buses for each different digit each set including a bus for each position of the indicators of the different spaces belonging to that digit, a correspondence relay associated with each indicator of the several spaces, and a time sorter mechanism comprising a changeable sorter unit for each different digit and each unit having its different positions connected to the corresponding buses of the set of buses for the corresponding digit, time sorting control means operable to an active condition for governing the time sorter operation, means rendered effective by said time sorting control means in an active condition for causing the correspondence relay for the first digit for all registration spaces to be connected to that bus of its set corresponding to the position of its associated indicator, means rendered effective upon the energization of a correspondence relay for each digit, except the last, of any space to cause the correspondence relay of the next digit of the same space to be connected to that bus of its set corresponding to the position of its associated indicator, means rendered effective by said time sorting control means in an active condition, causing said sorter units to be operated in succession, each unit being initiated upon the completion of the operation of the preceding unit and the first being initiated by said time sorting control means, the operation of each sorter unit being initiated from a normal blank position and continuing through its successive positions until it reaches a bus to which the application of energy by its contacts for that position causes the energization of a correspondence relay for some space of the corresponding digit at which position it is held to allow the operation of the next time sorter unit, whereby said time sorter units are positioned to indicate the earliest time displayed by the indicators of any registration space.

23. In a time sorting organization, a posting panel having a plurality of registration spaces each including changeable indicators for the different digits of a time schedule, a set of buses for each different digit and each set including a bus for each position of the indicators so that such bus is connected to the same position of each indicator for the different spaces belonging to that digit, a correspondence relay associated with each indicator of the several spaces, and a time sorter mechanism comprising, a changeable sorter unit for each different digit of time and each unit having its different positions connected to the corresponding buses of the set for the corresponding digit, time sorting control means manually operable to an active condition, circuit means rendered effective by said time sorting control means in an active condition for causing the correspondence relay for the first digit for all registration spaces to be conditioned so that the connection of energy to that bus of its set corresponding to the position of its associated indicator will cause its energization, means rendered effective upon the energization of a correspondence relay of a digit of any space to cause the correspondence relay of the next digit of the same space to be conditioned so that the application of energy to the bus of its set corresponding to the position of its associated indicator will cause its energization, means rendered active by said time sorting control means in an active condition for causing said sorter units to be operated in succession each unit being initiated upon the completion of the operation of the preceding unit and the first unit being initiated by said time sorting control means, the operation of each sorter unit being from its normal blank position through its successive positions until it reaches a position to which the application of energy causes the energization of a correspondence relay for some space relating to the corresponding digit at which position it is held to allow the operation of the next sorter unit, and means associated with each registration space and acting when the time sorter units identify the time schedule stored on the indicators of that space as the earliest time schedule by energizing the correspondence relay for each digit of that space, to then render all of the correspondence relays of that space inactive, whereby said time sorter units are first positioned to indicate the earliest time displayed by the indicators of any registration space, and are then operated in succession to identify the other time schedules registered in said spaces in accordance with the time sequence of their respective schedules.

24. In a flight scheduling system, a posting panel having a plurality of registration spaces each including a number of changeable indicators operable from normal blank positions to different positions to represent the data of a flight schedule, one Teletype apparatus for making a punched tape record of each code message characterized at its beginning by a distinctive symbol to identify it as a new flight schedule to be posted, another Teletype apparatus for making a punched tape record of each code message characterized by a different distinctive symbol to identify it as a flight schedule to be wiped-out, a Teletype receiver for receiving various messages including flight schedules to be posted and flight schedules to be wiped-out, routing means for causing said new flight schedules to be repeated to said one Teletype apparatus to thereby create a punched tape record of such message, said routing means also acting to cause said messages characterized as a wipe-out flight schedule to be repeated to said another Teletype apparatus to thereby make a punched tape record of such message, and posting control means initiated and governed by said one and said another Teletype apparatus and their punched tape records to post new flight schedules in the next vacant registration space of said panel and to wipe-out designated old flight schedules in accordance with the punched tape record to cause the restoration of the changeable indicators identifying such flight schedule to their normal blank positions, said posting control means performing the wipe-out operation in preference to the posting operation to thereby provide all available vacant spaces for the posting of new flight schedules.

25. In a flight schedule organization, a posting panel having a plurality of groups of changeable indicators for displaying different scheduled times, means for causing the posting of a series of time schedules in successive groups of changeable indicators regardless of the times such schedules represent, sorting means manually initiated for comparing the time schedules already posted in said posting panel for identifying said schedules in a chronological order determined by the times they represent, and means governed by said sorting means for reposting said schedules in the identified order.

26. In a flight schedule organization, a posting panel for displaying different scheduled times by having changeable indicators operable to distictive positions for different posting spaces, means for causing a plurality of scheduled times to be displayed in successive posting spaces of said posting panel irrespective of the scheduled times, a sequence displaying panel having changeable indicators for displaying different scheduled times in different posting spaces, reposting means acting when rendered effective to cause scheduled times to be posted in successive posting spaces of said sequence displaying panel, and means for causing said scheduled times as displayed by said posting panel to be identified successively in exact chronological order and acting in the same succession to render said reposting means effective, whereby the schedules posted in random order in said posting panel are reposted in exact chronological order in said sequence displaying panel.

27. In a flight scheduling organization, a record panel and a sequence panel each having changeable indicators in different posting spaces operable to distinctive positions to represent the data of a flight schedule including a scheduled time in each such posting space, means for effecting the posting operation for each new flight schedule in the next vacant space of said record panel regardless of the scheduled time included in the schedule date, sorting means governed by the changeable indicators of the posting spaces of said record panel having scheduled times posted therein for sorting such schedules in a manner to successively identify them in exact chronological order, and reposting means governed by said sorting means for causing the successively identified flight schedules to be reposted in successive spaces of said sequence panel.

28. In a flight scheduling organization, a storage panel for individually storing a plurality of different flight schedules in different posting spaces, each of such schedules including a time, means for adding new flight schedules one at a time to said storage panel in successive vacant spaces independently of the times for such schedules, a sequence panel having a pluraliay of posting spaces for individually registering different time schedules in the successive posting spaces one at a time as the flight schedules are received by the sequence panel, time sorting means manually set into operation to compare the times for the various flight schedules stored in the different posting spaces of said storage panel to determine in a series of successive identifying operations the exact chronological order of the times schedules in the different posting spaces, said means also acting to transfer the flight schedules as successively identified to the posting spaces of said sequence panel, whereby the manual initiation of said sorting means is effective to cause the light schedules of said storage panel to be reposted in chronological order on said sequence panel, and wipe-out means for cancelling any flight schedule posted on said storage and sequence panels.

29. In a flight scheduling organization, a record panel and a sequence panel each including a plurality of posting spaces and each posting space including a plurality of changeable indicators operable from normal blank positions to different indicating positions for displaying a flight schedule including a scheduled time, means associated with each panel for operating and restoring to normal the changeable indicators in any selected posting space, vacant space selecting means associated with each of said panels for selecting for operation the posting spaces of its panel in succession to give the next vacant space nearest one end of that panel for the posting of a new flight schedule, a communication system for supplying new flight schedules to said record board for posting in the next vacant space as selected by the vacant space selecting means for that panel regardless of the particular scheduled time assigned to that flight, and manually initiated time sorting means governed by the changeable indicators relating to the different digits of time for the flight schedules posted in said record panel for successively comparing the different digits of the schedule times then standing in the posting spaces of said record panel to successively identify in chronological order the various flight schedules then posted, and at the same time cause the transmission of such flight schedule respectively and successively to said sequence panel, whereby said sequence panel displays the various flight schedules in the order in which the flights are due.

30. In a flight scheduling organization, a posting panel for displaying the flight data for different scheduled flights by having changeable indicators operable to distinctive positions in different posting spaces including changeable indicators relating to different digits of time for the scheduled times of the various flights, posting means for causing each new flight schedule to be posted in the next vacant space of said posting panel regardless of the time schedule assigned to that particular flight, time sorting means including a set of buses relating to the different digits of the scheduled time and respectively energized dependent upon the position of the changeable indicators for such digits of time in the different posting spaces, a sorting mechanism including a multiple position unit for each different digit of time, a position identified relay associated with each posting space and energized when that space has been identified as the last in order of the time schedules, said time sorting means acting when manually initiated to successively identify the posting spaces and energize the associated position identified relay, a sequence displaying panel having changeable indicators in different posting spaces operable for displaying the data of different flight schedules, said changeable indicators of said display board being so controlled as to select the next vacant space for each successive flight schedule transferred to its board, and means governed by said time sorting means in its successive operations to successively transfer the identified flight schedules on said record board to said sequence display board, whereby the incoming flight schedules can be immediately posted without waiting for a time comparison although they can be located in proper chronological order on said sequence displaying panel whenever an operator initiates a time sorting operation.

31. In a flight scheduling system of the character described, a posting panel having a plurality of registration spaces each space including a number of changeable indicators operable from normal blank positions to different operated positions to represent the data of a flight schedule, at least one changeable indicator of each space having a contact assuming one position when that indicator is in its normal blank position and assuming a different position when that indicator is in any of its operated positions, posting control means effective to initiate into operation the changeable indicators of any selected registration space to cause their operation to positions in accordance with the data of a new flight schedule, vacant space selecting means acting when said posting control means is effective to select the next vacant registration space for operation, said vacant space selecting means including a chain circuit connecting said contacts of said changeable indicators in the registration spaces, a bypass switch associated with each registration space and having contacts included in said circuit for rendering the changeable indicators of its associated registration space effective to be selected for operation when in one position and acting to render the changeable indicators of its registration space unresponsive for selection when in the other position in a manner to cause said space selecting means to select for operation the changeable indicators of the next succeeding vacant registration space.

NEIL D. PRESTON.
FOREST B. HITCHCOCK.

REFERENCES CITED

The following references are of record in the file of this patent:

UNITED STATES PATENTS

| Number | Name | Date |
| --- | --- | --- |
| 2,386,743 | May | Oct. 9, 1945 |
| 2,391,469 | Marshall | Dec. 25, 1945 |